United States Patent
Mitchell et al.

(10) Patent No.: US 7,102,877 B2
(45) Date of Patent: Sep. 5, 2006

(54) ELECTRODE IMPREGNATION AND BONDING

(75) Inventors: Porter Mitchell, San Diego, CA (US); Xiaomei Xi, Carlsbad, CA (US); Linda Zhong, San Diego, CA (US); Vincent Hermann, Prilly (CH)

(73) Assignee: Maxwell Technologies, Inc., San Diego, CA (US)

(*) Notice: Subject to any disclaimer, the term of this patent is extended or adjusted under 35 U.S.C. 154(b) by 0 days.

(21) Appl. No.: 10/900,825

(22) Filed: Jul. 28, 2004

(65) Prior Publication Data

US 2005/0057888 A1    Mar. 17, 2005

Related U.S. Application Data

(60) Provisional application No. 60/512,802, filed on Oct. 20, 2003, provisional application No. 60/502,376, filed on Sep. 12, 2003.

(51) Int. Cl.
     *H01G 9/00* (2006.01)
(52) U.S. Cl. .......................... 361/502; 361/503
(58) Field of Classification Search ........ 361/502–503, 361/508, 528; 429/233, 239
See application file for complete search history.

(56) References Cited

U.S. PATENT DOCUMENTS

| | | | |
|---|---|---|---|
| 4,481,558 A * | 11/1984 | Endoh et al. ................. 361/303 |
| 5,150,283 A * | 9/1992 | Yoshida et al. ............. 361/502 |
| 5,198,313 A | 3/1993 | Juergens |
| 5,786,555 A * | 7/1998 | Saito et al. ................ 204/294 |
| 5,849,431 A | 12/1998 | Kita et al. |
| 6,127,474 A * | 10/2000 | Andelman ................. 524/495 |
| 6,187,061 B1 * | 2/2001 | Amatucci et al. ........ 29/25.03 |
| 6,201,685 B1 * | 3/2001 | Jerabek et al. ............. 361/502 |
| 6,310,756 B1 | 10/2001 | Miura et al. |
| 6,359,769 B1 | 3/2002 | Mushiake et al. |
| 6,589,299 B1 | 7/2003 | Missling et al. |
| 6,697,249 B1 | 2/2004 | Maletin et al. |
| 6,800,222 B1 * | 10/2004 | Noguchi et al. ............ 252/502 |
| 2002/0039275 A1 | 4/2002 | Takeuchi et al. |
| 2002/0059975 A1 * | 5/2002 | Ishikawa et al. ......... 156/89.13 |
| 2002/0122985 A1 | 9/2002 | Sato et al. |
| 2002/0138958 A1 * | 10/2002 | Nonaka et al. ............ 29/25.03 |
| 2002/0167784 A1 | 11/2002 | Takatami et al. |
| 2003/0157314 A1 | 8/2003 | Penneau et al. |
| 2003/0169558 A1 * | 9/2003 | Olson et al. ................ 361/502 |
| 2004/0027782 A1 * | 2/2004 | Erhardt et al. ............. 361/302 |
| 2005/0024814 A1 * | 2/2005 | Noguchi et al. ............ 361/502 |

FOREIGN PATENT DOCUMENTS

WO    WO 98/34977    * 8/1998

* cited by examiner

*Primary Examiner*—Eric W. Thomas
(74) *Attorney, Agent, or Firm*—Hensley Kim & Edgington, LLC

(57) ABSTRACT

A method for making an electrode including a particle based film is disclosed in which the film is coated and/or impregnated with veins of conductive material. A support backing is placed adjacent to one side of the film to provide support and prevent damaging the film while the conductive material is applied onto the opposite side of the film. The film is bonded directly to a current collector of an energy storage device.

16 Claims, 19 Drawing Sheets

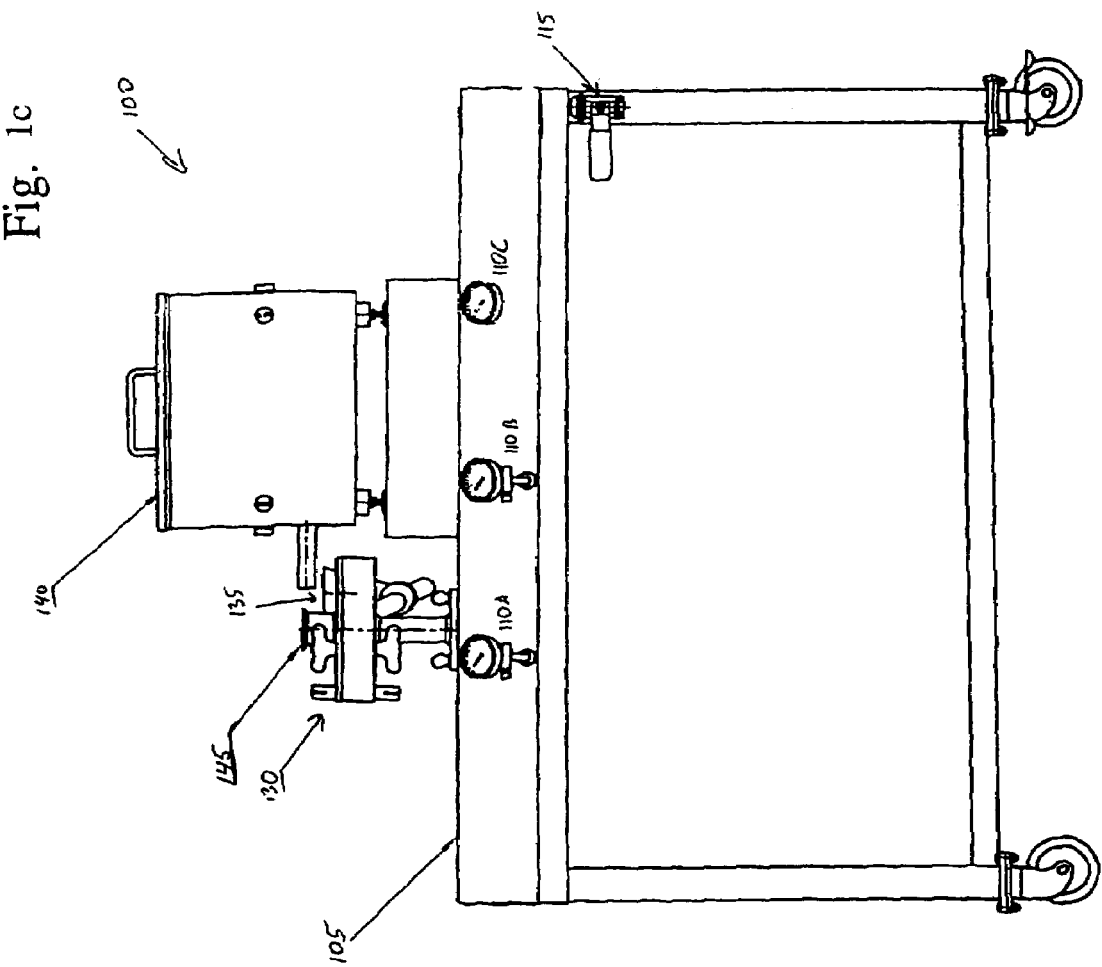

ELECTRODE IMPREGNATION AND BONDING

RELATED APPLICATIONS

The present application is related to and claims priority from commonly assigned copending Provisional Application Ser. No. 60/512,802, filed 20 Oct. 2003; and The present application is related to and claims priority from commonly assigned copending Provisional Application Ser. No. 60/502,376, filed 12 Sep. 2003.

FIELD OF THE INVENTION

The present invention relates generally to the field of electrodes. More particularly, the present invention relates to bonding of electrodes to collectors.

BACKGROUND

Energy storage devices typically comprise a plurality of electrodes. One type of energy storage device is a battery, another is a double-layer capacitor. Double-layer capacitors, also referred to as ultracapacitors and super-capacitors, are energy storage devices that are able to store much more energy per unit weight and unit volume than traditional capacitors such as electrolytic capacitors. In part, the performance of double-layer capacitors is limited by its internal resistance. The chemistry and physics of known double-layer capacitor technology limits the maximum cell operating voltage of a double-layer capacitor to less than about 4 volts, above which destructive breakdown will occur. A typical nominal operating voltage is about 2.5–3.0 volts.

Known electrode designs include conductive carbon layers. The carbon layers are typically bonded to a conductive current collector by an adhesive/bonding layer or film. When current is passed through the electrode, the interfacial contact resistance between the adhesive/bonding layer, collector, and the electrode film creates a voltage drop and generation of heat, thus, wasting energy meant to be stored. Increased contact resistance also increases a capacitors RC time constant and, thus, its charge and discharge time.

In energy storage devices that employ electrodes comprised of a carbon cloth, one method used to reduce interfacial contact resistance utilizes coating of one side the carbon cloth with molten sprayed metal. The thermal spraying process acts to impregnate the carbon cloth with conductive metal. This provides conductive paths throughout the thickness of the carbon cloth and allows for a metal-to-metal contact between the impregnated carbon cloth electrode and a metal current collector.

It is desirable to minimize the internal resistance of energy storage devices, because, generally speaking, energy storage devices having a low internal resistance can be charged and can, in turn, deliver stored energy more quickly, at a higher power density, with increased voltage, and without excessive generation of heat.

SUMMARY OF THE INVENTION

These and other needs are satisfied by electrodes and methods of making the same according to the present invention. The present invention provides methods for making electrodes and electrodes that are long-lasting, durable, and inexpensive to produce. The methods can be used to lower the internal resistance of electrodes employing particle based films. The methods reduce the internal resistance by lowering contact resistances between an electrode film and a current collector. The methods also reduce the internal-resistance by lowering contact resistance between carbon particles in the film. The disclosures herein describe one or more embodiments that provide electrode fabrication methods for producing low internal resistance, particle based film electrodes, which can be used in energy storage devices such as double-layer capacitors, ultracapacitors, super-capacitors, fuel cells, batteries, and the like.

A method for making a conductive film employing a particle based conductive film according to the present invention can comprise placing a support backing adjacent to a first side of a conductive film, impregnating the conductive film with metal by spraying a second side of the conductive film, opposite the first side, with molten metal, wherein the support backing acts to prevent inertia of sprayed molten metal from damaging the conductive film. The support backing can also be configured to act as a heat sink to prevent heat damage to the conductive film from the molten metal.

In an electrode fabrication process according to the present invention, the internal resistance of the electrode is reduced by lowering the contact resistance between the film and the current collector and by lowering the contact resistance between the internal conductive particles based in the film. In one embodiment, the electrode fabrication process does not need to utilize an additional adhesive/bonding layer between the conductive film and the current collector.

In one embodiment, a method for preparing a conductive film for use in an electrode comprises steps of placing a support backing on a first side of the conductive film; applying a conductive material to a second side of the conductive film, opposite the first side, such that the conductive material penetrates the conductive film and coats the second side of the conductive film; wherein the conductive film comprises a particle based conductive material. The support backing may comprise a backing plate. The support backing may comprise a roll. The support backing may comprise an electrode separator. The step of placing may comprise laminating the conductive film to the separator prior to the applying step. The support backing may be configured to operate as a heat sink to prevent heat damage to the conductive film from the conductive material. The support backing may be porous. The step of placing may comprise providing a partial vacuum to hold the conductive film to the support backing. The step of applying may comprise flame spraying. The step of applying may comprise arc spraying. The step of applying may comprise plasma spraying. The step of applying may comprise high velocity oxygen fuel thermal spraying. The step of applying may comprise spraying a molten conductive material using a spray unit wherein current to the spray unit is optimized such that the molten conductive material evenly penetrates the conductive film. The step of applying may comprise spraying a molten conductive material using a spray unit wherein the pressure of the spray unit is optimized such that the molten conductive material evenly penetrates the conductive film. The step of applying may comprise optimizing a standoff distance of a sprayed molten conductive material from the conductive film such that the sprayed molten conductive material evenly penetrates the conductive film. The step of applying may comprise optimizing a vertical step distance of a sprayed molten conductive material such that the sprayed molten conductive material evenly penetrates the conductive film. The step of applying may comprise optimizing a sweep rate of a sprayed molten conductive material such that the sprayed molten conductive material evenly penetrates the conductive film. The conductive film may comprise dry process based film. The conductive material may comprise molten metal. The molten metal may comprise molten aluminum.

In one embodiment, a method for making an electrode, comprises providing a dry process based conductive film; placing a support backing adjacent to a first side of the conductive film; applying to a second side of the conductive film, opposite the first side, a conductive material such that the conductive coats the second side of the conductive film; and bonding the conductive film to a current collector with the second side of the conductive film adjacent to the current collector. The support backing may comprise a backing plate. The support backing may comprise a roll. The support backing may comprise a separator. The step of placing may comprise laminating the separator to the first side of the conductive film prior to the applying step. The support backing may be configured to operate as a heat sink to prevent heat damage to the conductive film. The support backing may be porous. The step of placing may comprise providing a partial vacuum to hold the conductive film to the support backing. The step of applying may comprise flame spraying. The step of applying may comprise arc spraying. The step of applying may comprise plasma spraying. The step of applying may comprise high velocity oxygen fuel thermal spraying. The step of applying may comprise spraying a molten conductive material using a spray unit wherein current to the spray unit is optimized such that the molten conductive material penetrates the conductive film. The step of applying may comprise spraying a molten conductive material using a spray unit wherein the pressure of the spray unit is optimized such that the molten conductive material penetrates the conductive film. The step of applying may comprise optimizing a standoff distance of a sprayed molten conductive material from the conductive film such that the molten conductive material penetrates the conductive film. The step of applying may comprise optimizing a vertical step distance of a sprayed molten conductive material such that the molten conductive material penetrates the conductive film. The step of applying may comprise optimizing a sweep rate of a sprayed molten conductive material such that the molten conductive material penetrates the conductive film. The dry process based conductive film may comprise a dry fibrillized carbon particle and binder particle mixture. The conductive material may comprise molten metal. The molten metal may comprise molten aluminum. The may include removing the support backing. The step of bonding may comprise bonding the conductive film directly to a bare current collector.

In one embodiment, a method of making a double-layer electrode comprises the steps of laminating a separator between two conductive films adjacent to a first side of each of the two films; spraying a second side of each of the two films, opposite the first side, with a conductive material such that the conductive material coats the second side of each of the conductive films; and bonding a bare current collector directly to the second side of each of the conductive films. The step of spraying may comprise spraying a conductor. The conductive films may comprise dry fibrillized carbon and binder particles.

In one embodiment, an energy storage device comprises an electrode film, the film comprising a blend of carbon and binder particles; a collector; a conductor, wherein the conductor is disposed between the collector and the film. The collector may comprise aluminum. The conductor may be coupled to the collector. The conductor may penetrate penetrates between the particles. The conductor may comprise a sprayed conductor. The conductor may comprise a metal. The blend may be a dry fibrillized blend of carbon and binder particles. The device may comprise a capacitor. The device may comprise a battery. The device may comprise a fuel cell. The capacitor may comprise a double-layer capacitor. The collector may be a bare collector.

In one embodiment, an energy storage product comprises a self supporting electrode film; and a conductive metal, wherein the conductive metal is coupled to one side of the film. The electrode may be disposed onto a storage roll. The conductive metal may be disposed between the collector and the film. The electrode may be disposed onto a storage roll. The separator may be coupled to a second side of the film. The film may be self-aligning to the collector.

These and other features and aspects of the present invention will be better understood with reference to the following description, drawings, and appended claims.

BRIEF DESCRIPTION OF THE DRAWINGS

FIGS. 1c–j illustrate apparatus used to achieve an electrode film.

DETAILED DESCRIPTION

Figure 1A:
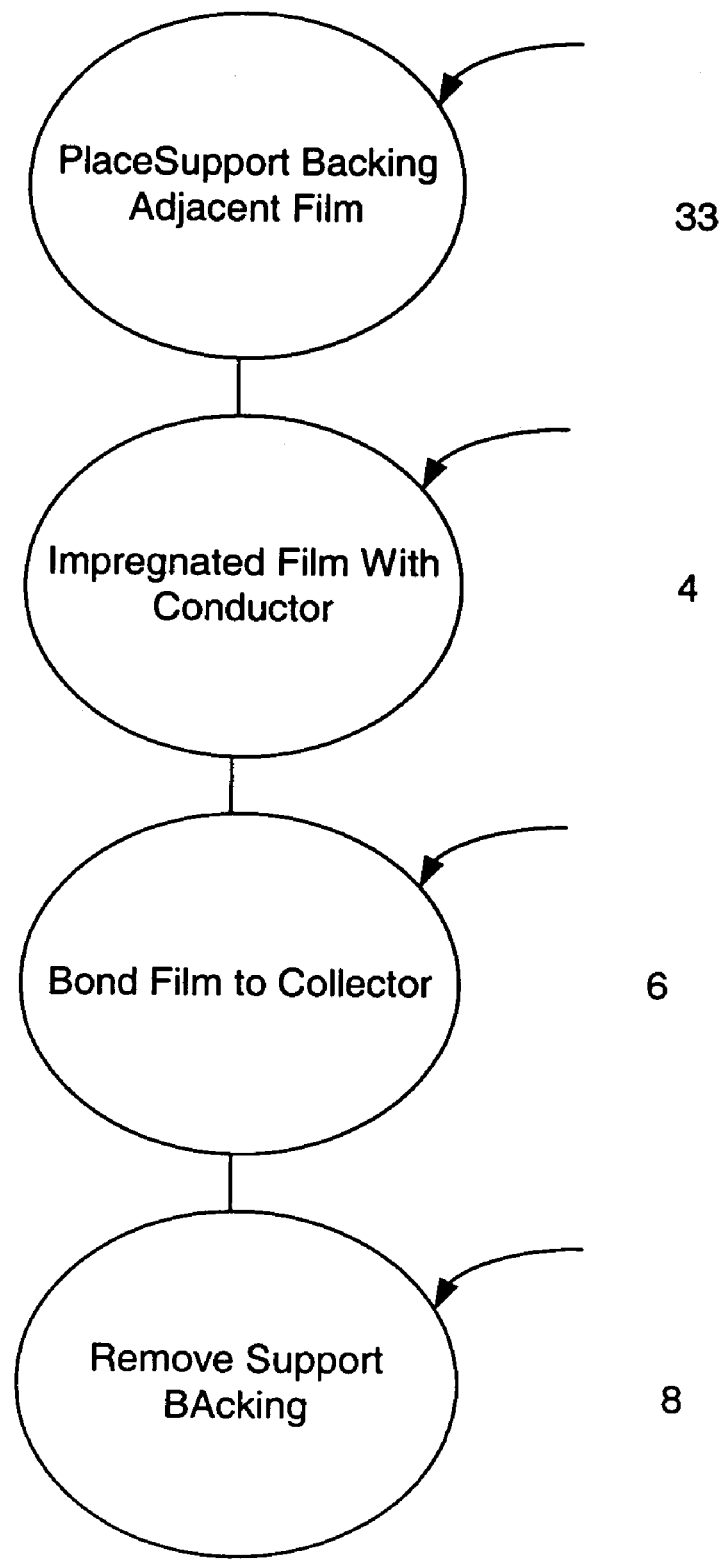
FIG. 1a illustrates process steps in making an electrode.

In accordance with the present invention, a method for preparing a conductive electrode film, and an associated electrode and method of making the same are described. Embodiments of the invention can best be understood with reference to the accompanying Figures. Wherever practicable, same reference numerals are used in the drawings and the description to refer to the same parts. Occasionally, similar numerals are used to refer to like parts in different drawings. The drawings are in a simplified form and not to precise scale. For purposes of convenience and clarity, directional terms, such as top, bottom, left, right, up, down, over, above, below, beneath, rear, and front are used with respect to the accompanying drawings. These and similar directional terms should not be construed to limit the scope of the invention.

Thermal spraying techniques have found benefits when used with carbon cloth based electrodes. As such, thermal spraying techniques have, till present, not been adapted to work with prior art conductive electrode films based on extrusion processes, in part because the inertia of the applied molten metal has tended to easily damage or destroy such wet films. The present invention, however, provides an efficient and reliable method of coating and impregnating particle based conductive electrode films with conductive material, and then bonding the films to a current collector.

Referring now to FIG. 1a, there is seen a diagram illustrating one embodiment of a method for preparing a conductive electrode film for use in an energy storage device. The process of FIG. 1a begins in step 33 by placing a backing adjacent to one side of an electrode film to provide a physical support structure. In one embodiment, the film is formed of compacted carbon and binder particles. In one embodiment, the electrode film is formed by a dry process that utilizes a mixture of dry fribrillized binder and carbon particles. In one embodiment, the electrode film is formed by a dry process that does not utilize any solvent or solution, Embodiments of a dry process based electrode and associated methods are described in commonly assigned patent application Ser. No. 10/817,702, which is incorporated herein by reference. Various benefits and advantages derived from use of dry process based electrodes, over that of the prior art solvent based electrodes, are described in the aforementioned application. For example, one or more embodiment of a dry process based electrode films is capable as being formed as a relatively long strong tensile strength self-supporting film. The use of a long strong self-supporting electrode film allows that such films can be readily handled as well as adapted for use with spaying of the film as described by one or more of the embodiments that follow.

In the embodiments that follow, it will be understood that reference to dry process and no-use and non-use of additive (s) in the manufacture of a conductive electrode film takes into account that electrolyte may be used during a final electrode electrolyte immersion/impregnation step. An electrode electrolyte immersion/impregnation step is typically utilized prior to providing a final finished electrode in a sealed housing. Furthermore, even though additives, such as solvents, liquids, and the like, are not used in the manufacture of embodiments disclosed herein, during manufacture, a certain amount of impurity, for example, moisture, may be absorbed or attach itself from a surrounding environment. Those skilled in the art will understand that the dry particles used with embodiments and processes disclosed herein may also, prior to their being provided by particle manufacturers as dry particles, have themselves been pre-processed with additives and, thus, comprise one or more pre-process residue. For these reasons, despite the non-use of additives, one or more of the embodiments and processes disclosed herein may require a drying step (which, however, if performed with embodiments of the present invention, can be much shorter than the drying steps of the prior art) prior to a final electrolyte impregnation step so as to remove/reduce such aforementioned pre-process residues and impurities. It is identified that even after one or more drying step, trace amounts of the aforementioned pre-process residues and impurities may be present in the prior art, as well as embodiments described herein.

In general, because both the prior art and embodiments of the present invention obtain base particles and materials from similar manufacturers, and because they may be exposed to similar pre-process environments, measurable amounts of prior art pre-process residues and impurities may be similar in magnitude to those of electrode films disclosed herein, although variations may occur due to differences in pre-processes, environmental effects, etc. In the prior art, the magnitude of such pre-process residues and impurities is smaller than that of the residues and impurities that remain and that can be measured after processing additives are used. This measurable amount of processing additive based residues and impurities can be used as an indicator that processing additives have been used in a prior art energy storage device product. The lack of such measurable amounts of processing additive can as well be used to distinguish the non-use of processing additives.

Table 1 indicates the results of a chemical analysis of a prior art electrode film and an embodiment of a dry electrode film made in accordance with principles disclosed further herein. The chemical analysis was conducted by Chemir Analytical Services, 2672 Metro Blvd., Maryland Heights, Mo. 63043, Phone 314-291-6620. Two samples were analyzed with a first sample (Chemir 533572) comprised of finely ground powder obtained from a prior art additive and solvent based extruded electrode film sold under the EXCELLERATOR™ brand of electrode film by W. L Gore & Associates, Inc. 401 Airport Rd., Elkton, Md. 21922, 410-392-444, which in one embodiment is referenced under part number 102304. A second sample (Chemir 533571) comprised a thin black sheet of material cut into ⅛ to 1 inch sided irregularly shaped pieces obtained from a dry process based electrode film made according to embodiments described herein. The second sample (Chemir 533571) comprised a particle mixture of about 80% to 90% activated carbon, about 0% to 15% conductive carbon, and about 3% to 15% PTFE binder by weight. Suitable carbon powders are available from a variety of sources, including YP-17 activated carbon particles sold by Kuraray Chemical Co., LTD, Shin-hankyu Bldg. 9F Blvd. C-237, 1-12-39 Umeda, Kiataku, Osaka 530-8611, Japan; and BP 2000 conductive particles sold by Cabot Corp. 157 Concord Road, P.O. Box 7001, Billerica, Mass. 01821-7001, Phone: 978 663-3455. A tared portion of prior art sample Chemir 53372 was transferred to a quartz pyrolysis tube. The tube with its contents was placed inside of a pyrolysis probe. The probe was then inserted into a valved inlet of a gas chromatograph. The effluent of the column was plumbed directly into a mass spectrometer that served as a detector. This configuration allowed the sample in the probe to be heated to a predetermined temperature causing volatile analytes to be swept by a stream of helium gas into the gas into the gas chromatograph, and through the analytical column and to be detected by the mass spectrometer. The pyrolysis probe was flash heated from ambient temperature at a rate of 5 degrees C./millisecond to 250 degrees C. and held constant for 30 seconds. The gas chromatograph was equipped with a 30 meter Agilent DB-5 analytical column. The gas chromatograph oven temperature was as follows: the initial temperature was held at 45 degrees C. for 5 minutes and then was ramped at 20 degrees C. to 300 degrees C. and held constant for 12.5 minutes. A similar procedure was conducted for dry film sample 53371. Long chain branched hydrocarbon olefins were detected in both samples, with 2086 parts per million (PPM) detected in the prior art sample, and with 493 PPM detected in the dry film. Analytes dimethylamine and a substituted alkyl propanoate were detected in sample Chemir 53372 with 337 PPM and were not detected in sample Chemir 53371. It is envisioned that future analysis of other prior art additive based electrode films will provide similar results with which prior art use of processing additives, or equivalently, the non-use of additives of embodiments described herein, can be identified and distinguished.

One or more prior art additives, impurities, and residues that exist in, or are utilized by, and that may be present in lower quantities in embodiments of the present invention than the prior art, include: hydrocarbons, high boiling point solvents, antifoaming agents, surfactants, dispersion aids, water, pyrrolidone mineral spirits, ketones, naphtha, acetates, alcohols, glycols, toluene, xylene, Isopars™, plasticizers, and the like.

TABLE 1

Pyrolysis GC/MS Analysis

| Retention Time in Minutes | Chemir 53371 | Chemir 53372 (Prior Art) |
|---|---|---|
| 1.65 | 0 PPM | 0 PPM |
| 12.3 | 0 PPM | 0 PPM |
| 13.6 | 0 PPM | Butylated hydroxyl toluene 337 PPM |
| 20.3 | 0 PPM | 0 PPM |
| 20.6 | A long chain branched hydrocarbon 493 PPM | A long chain branched hydrocarbon olefin 2086 PPM |

Figure 1B:
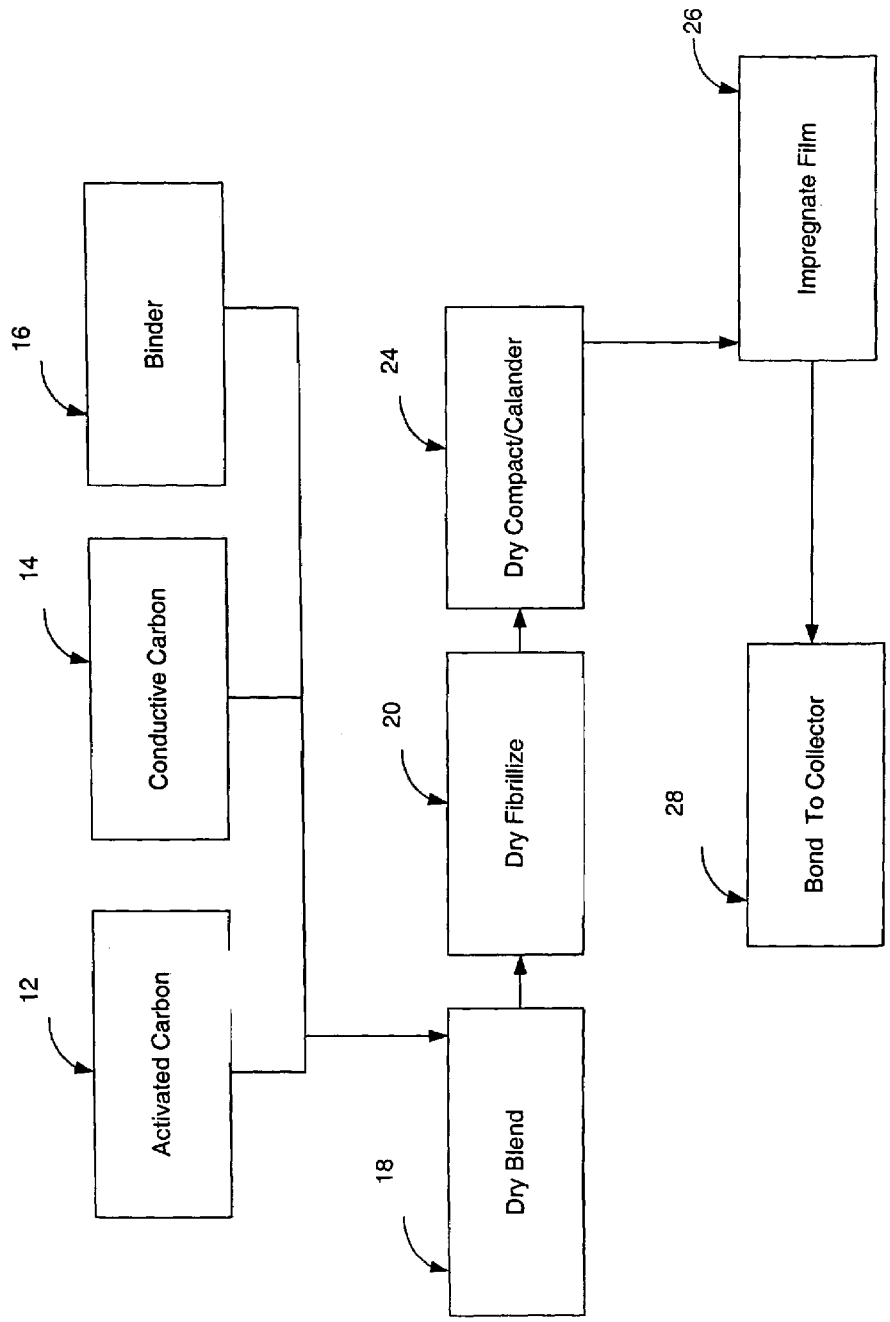
FIG. 1b illustrates process steps in making an electrode.

Referring now to FIG. 1b, a block diagram illustrating a process for making a dry particle based electrode is shown. As used herein, the term "dry" implies non-use of additives during process steps described herein, other than during a final impregnating electrolyte step. The process shown in FIG. 1b begins by blending dry carbon particles and dry binder together. As previously discussed, one or more of such dry carbon particles, as supplied by carbon particle manufacturers for use herein, may have been pre-processed. Those skilled in the art will understand that depending on particle size, particles can be described as powders and the like, and that reference to particles is not meant to be limiting to the embodiments described herein, which should be limited only by the appended claims and their equivalents. For example, within the scope of the term "particles," the present invention contemplates powders, spheres, platelets, flakes, fibers, nano-tubes, and other particles with other dimensions and other aspect ratios. In one embodiment, dry carbon particles as referenced herein refers to activated carbon particles 12 and/or conductive particles 14, and binder particles 16 as referenced herein refers to an inert dry binder. In one embodiment, conductive particles 14 comprise conductive carbon particles. In one embodiment, conductive particles 14 comprise conductive graphite particles. In one embodiment, it is envisioned that conductive particles 14 may comprise metal particle or the like. In one embodiment, dry binder 16 comprises a fibrillizable fluoropolymer, for example, polyteraflouroethylene (PTFE) particles. Other possible fibrillizable binders include ultra-high molecular weight polypropylene, polyethylene, co-polymers, polymer blends and the like. In one embodiment, particular mixtures of particles 12, 14, and binder 16 comprise about 50% to 99% activated carbon, about 0% to 25% conductive carbon, and/or about 0.5% to 50% binder by weight. In a more particular embodiment, particle mixtures include about 80% to 90% activated carbon, about 0% to 15% conductive carbon, and about 3% to 15% binder by weight. In one embodiment, the activated carbon particles 12 comprise a mean diameter of about 10 microns. In one embodiment, the conductive carbon particles 14 comprise diameters less than 20 microns. In one embodiment, the binder particles 16 comprise a mean diameter of about 450 microns. Suitable carbon powders are available from a variety of sources, including YP-17 activated carbon particles sold by Kuraray Chemical Co., LTD, Shin-hankyu Bldg. 9F Blvd. C-237, 1-12-39 Umeda, Kiata-ku, Osaka 530-8611, Japan; and BP 2000 conductive particles sold by Cabot Corp. 157 Concord Road, P.O. Box 7001, Billerica, Mass. 01821-7001, Phone: 978 663-3455.

In step 18, particles of activated carbon, conductive carbon, and binder provided during respective steps 12, 14, and 16 are dry blended together to form a dry mixture. In one embodiment, dry particles 12, 14, and 16 are blended for 1 to 10 minutes in a V-blender equipped with a high intensity mixing bar until a uniform dry mixture is formed. Those skilled in the art will identify that blending time can vary based on batch size, materials, particle size, densities, as well as other properties, and yet remain within the scope of the present invention. With reference to blending step 18, in one embodiment, particle size reduction and classification can be carried out as part of the blending step 18, or prior to the blending step 18. Size reduction and classification may improve consistency and repeatability of the resulting blended mixture and, consequently, of the quality of the electrode films and electrodes fabricated from the dry blended mixture.

After dry blending step 18, dry binder 16 within the dry particles is fibrillized in a dry fibrillizing step 20. The dry fibrillizing step 20 is effectuated using a dry solventless and liquidless high shear technique. During dry fibrillizing step 20, high shear forces are applied to dry binder 16 in order to physically stretch it. The stretched binder forms a network of thin web-like fibers that act to enmesh, entrap, bind, and/or support the dry particles 12 and 14. In one embodiment, fibrillizing step 20 may be effectuated using a jet-mill.

Figure 1D:
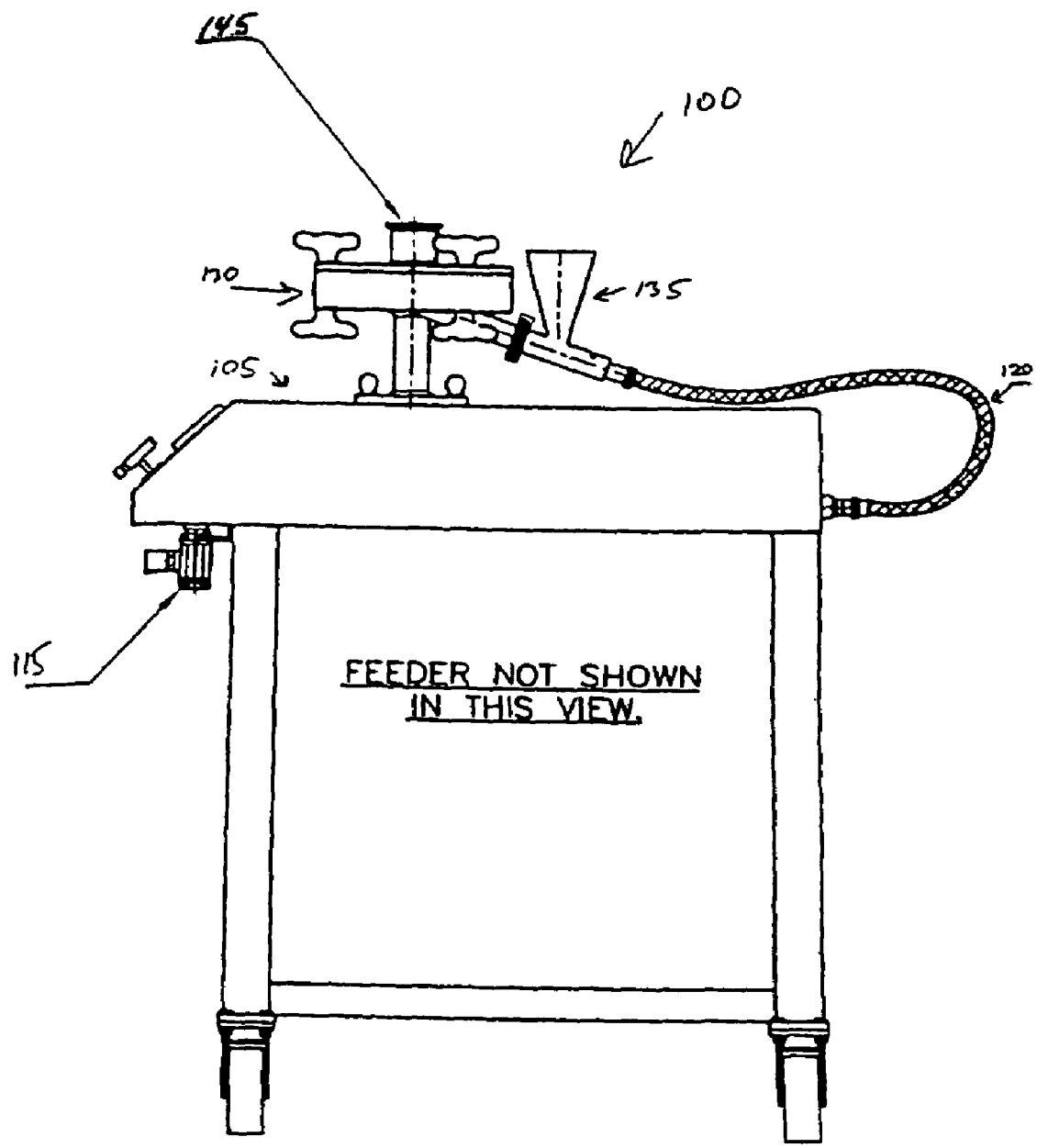
Figure 1E:
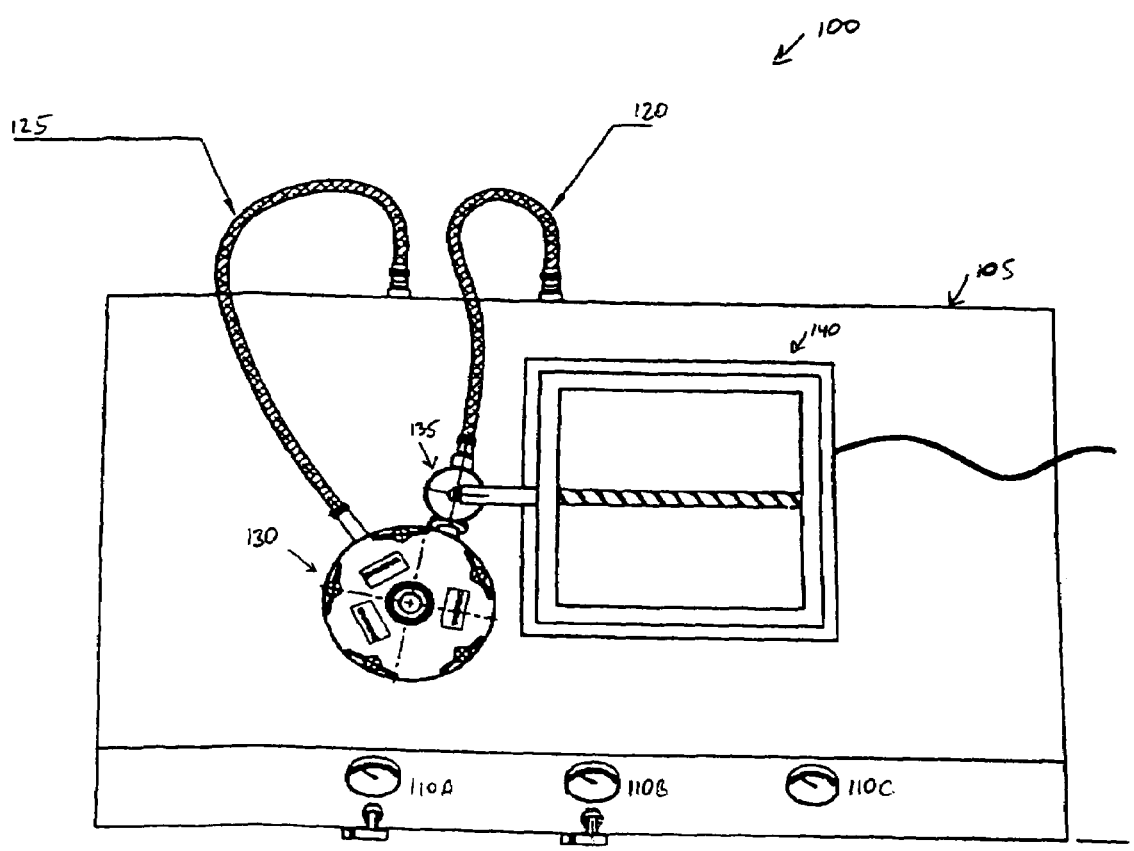

Referring to now to FIGS. 1c, 1d, and 1e, there is seen, respectively, front, side, and top views of a jet-mill assembly 100 used to perform a dry fibrillization step 20. For convenience, the jet-mill assembly 100 is installed on a movable auxiliary equipment table 105, and includes indicators 110 for displaying various temperatures and gas pressures that arise during operation. A gas input connector 115 receives compressed air from an external supply and routes the compressed air through internal tubing (not shown) to a feed air hose 120 and a grind air hose 125, which both lead and are connected to a jet-mill 130. The jet-mill 130 includes: (1) a funnel-like material receptacle device 135 that receives compressed feed air from the feed air hose 120, and the blended carbon-binder mixture of step 18 from a feeder 140; (2) an internal grinding chamber where the carbon-binder mixture material is processed; and (3) an output connection 145 for removing the processed material. In the illustrated embodiment, the jet-mill 130 is a 4-inch Micronizer® model available from Sturtevant, Inc., 348 Circuit Street, Hanover, Mass. 02339; telephone number (781) 829-6501. The feeder 140 is an AccuRate® feeder with a digital dial indicator model 302M, available from Schenck AccuRate®, 746 E. Milwaukee Street, P.O. Box 208, Whitewater, Wis. 53190; telephone number (888) 742-1249. The feeder includes the following components: a 0.33 cubic ft. internal hopper; an external paddle agitation flow aid; a 1.0-inch, full pitch, open flight feed screw; a ⅛ hp, 90VDC, 1,800 rpm, TENV electric motor drive; an internal mount controller with a variable speed, 50:1 turndown ratio; and a 110 Volt, single-phase, 60 Hz power supply with a power cord. The feeder 140 dispenses the carbon-binder mixture provided by step 18 at a preset rate. The rate is set using the digital dial, which is capable of settings between 0 and 999, linearly controlling the feeder operation. The highest setting of the feeder dial corresponds to a feeder output of about 12 kg per hour.

Figure 1F:
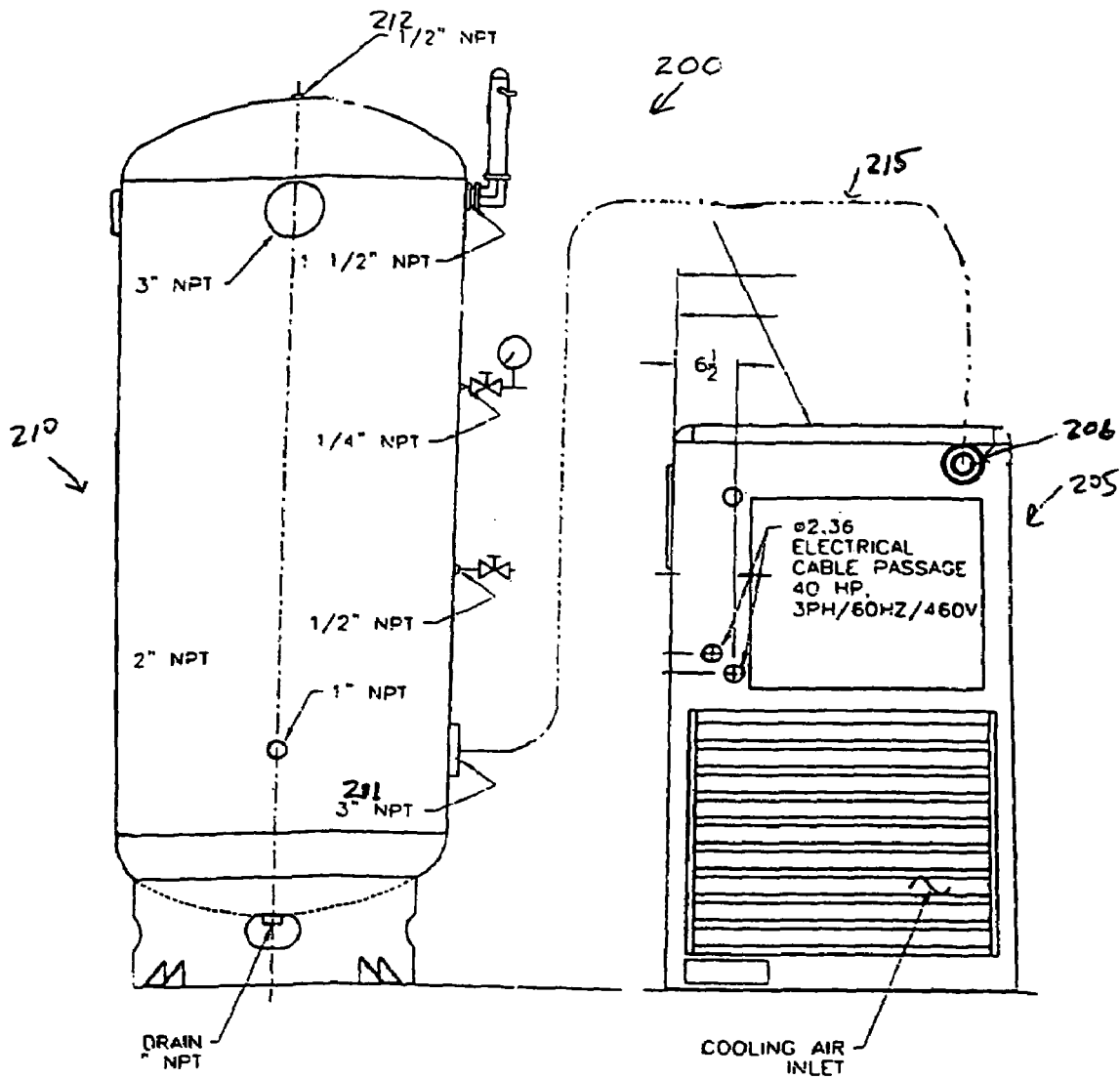
Figure 1G:
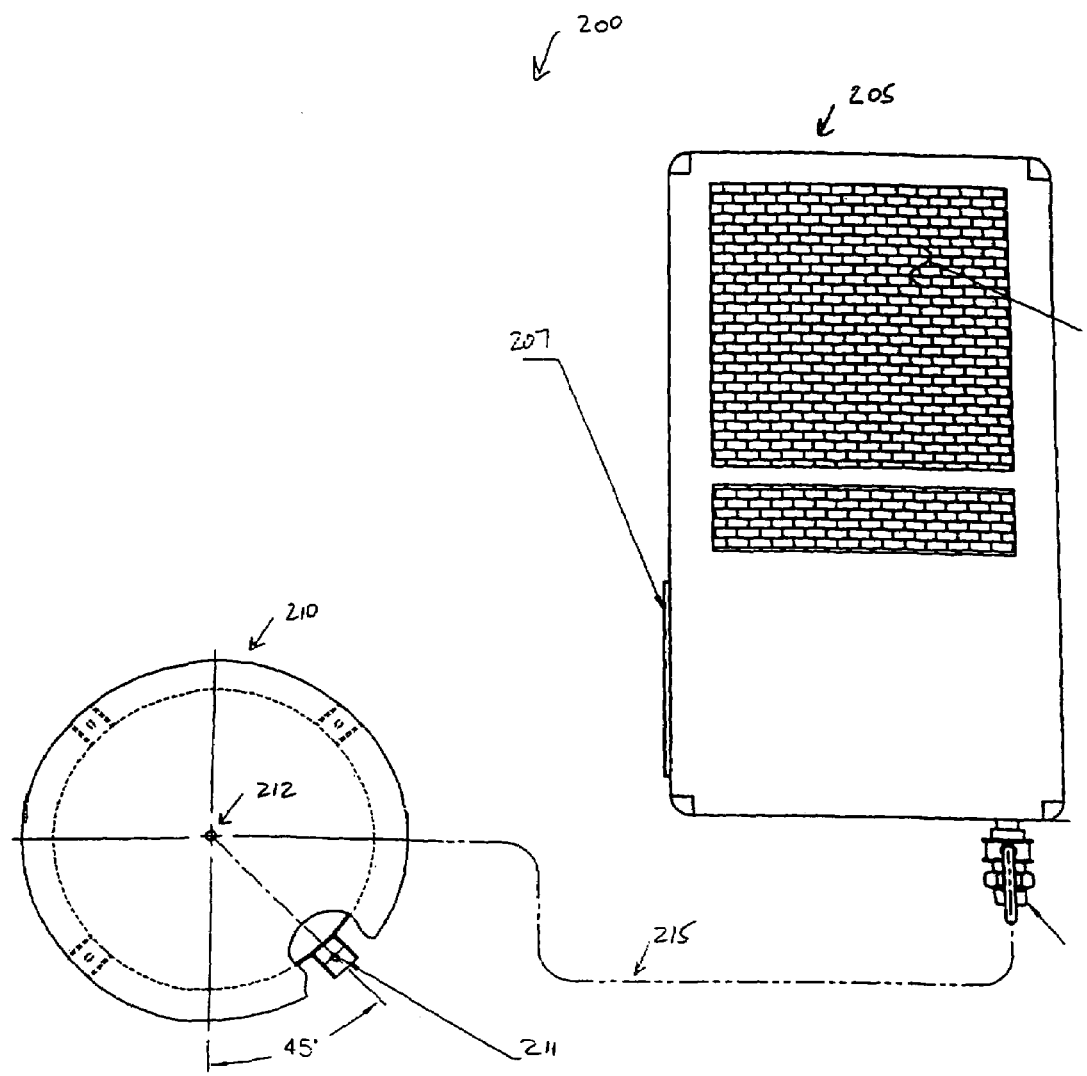

The feeder 140 appears in FIGS. 1c and 1e, but has been omitted from FIG. 1d, to prevent obstruction of other components of the jet-mill 130. As illustrated in FIGS. 1f and 1g the compressed air used in the jet-mill assembly 100 is provided by a combination 200 of a compressor 205 and a compressed air storage tank 210. The compressor 205 used in this embodiment is a GA 30-55C model available from Atlas Copco Compressors, Inc., 161 Lower Westfield Road, Holyoke, Mass. 01040; telephone number (413) 536-0600.

The compressor 205 includes the following features and components: air supply capacity of 180 standard cubic feet per minute ("SCFM") at 125 PSIG; a 40-hp, 3-phase, 60 HZ, 460 VAC premium efficiency motor; a WYE-delta reduced voltage starter; rubber isolation pads; a refrigerated air dryer; air filters and a condensate separator; an air cooler with an outlet 206; and an air control and monitoring panel 207. The 180-SCFM capacity of the compressor 205 is more than sufficient to supply the 4-inch Micronizer® jet-mill 130, which is rated at 55 SCFM. The compressed air storage tank 210 is a 400-gallon receiver tank with a safety valve, an automatic drain valve, and a pressure gauge. The compressor 205 provides compressed air to the tank 205 through a compressed air outlet valve 206, a hose 215, and a tank inlet valve 211.

It is identified that the compressed air provided under high-pressure by compressor 205 is preferably as dry as possible. Thus, in one embodiment, an appropriately placed in-line filter and/or dryer may be added. In one embodiment, a range of acceptable dew point for the air is about −20 to −40 degrees F., and water content of less than about 20 ppm. Although discussed as being effectuated by high-pressure air, it is understood that other sufficiently dry gases are envisioned as being used to fibrillize binder particles utilized in embodiments of the present invention, for example, oxygen, nitrogen, helium, and the like.

In the jet-mill 130, the carbon-binder mixture is inspired by venturi and transferred by the compressed feed air into a grinding chamber, where the fibrillization of the mixture takes place. In one embodiment, the grinding chamber is lined with a ceramic such that abrasion of the internal walls of the jet-mill is minimized and so as to maintain purity of the resulting jet-milled carbon-binder mixture. The grinding chamber, which has a generally cylindrical shape, includes one or more nozzles placed circumferentially. The nozzles discharge the compressed grind air that is supplied by the grind air hose 125. The compressed air jets injected by the nozzles accelerate the carbon-binder particles and cause predominantly particle-to-particle collisions, although some particle-wall collisions also take place. The collisions dissipate the energy of the compressed air relatively quickly, fibrillizing the dry binder 16 within the mixture and embedding carbon particle 12 and 14 aggregates and agglomerates into the lattice formed by the fibrillized binder. The collisions may also cause size reduction of the carbon aggregates and agglomerates. The colliding particles 12, 14, and 16 spiral towards the center of the grinding chamber and exit the chamber through the output connection 145.

Figure 1H:
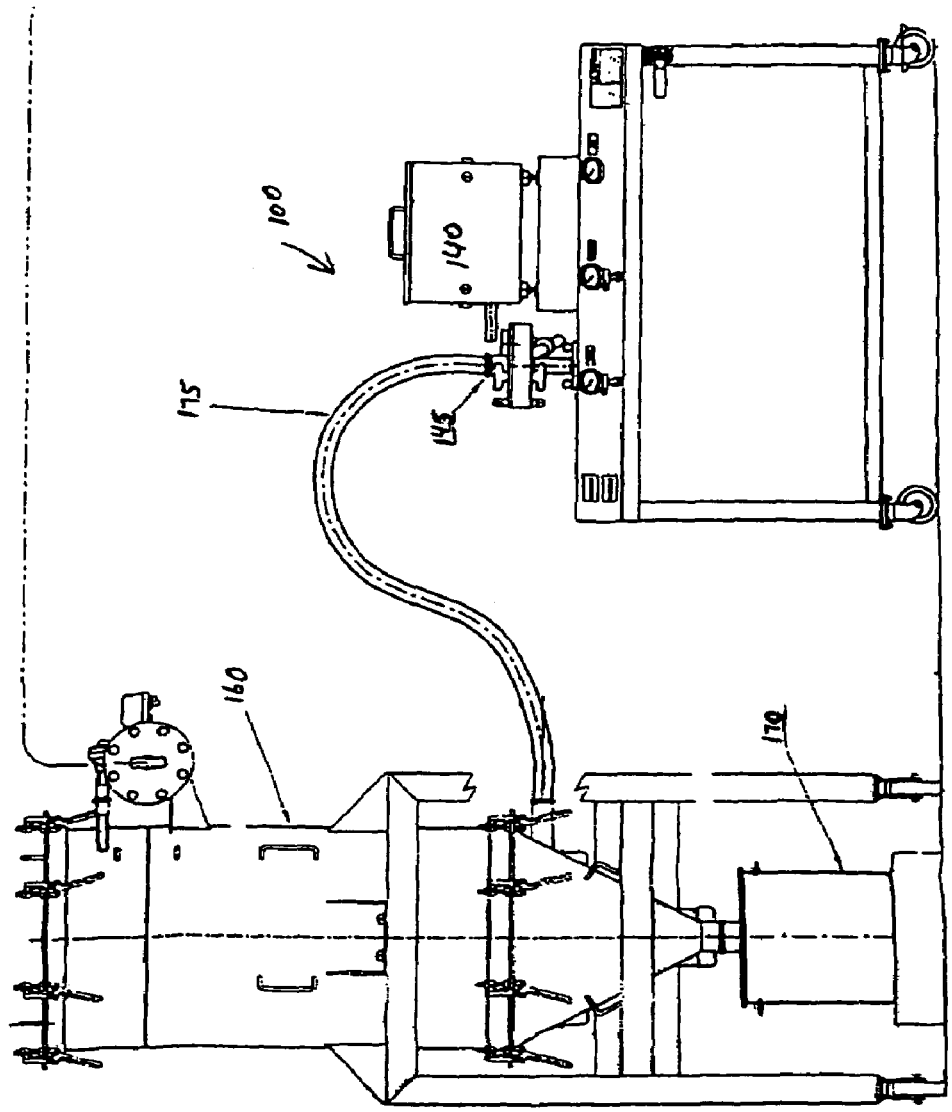
Figure 1I:
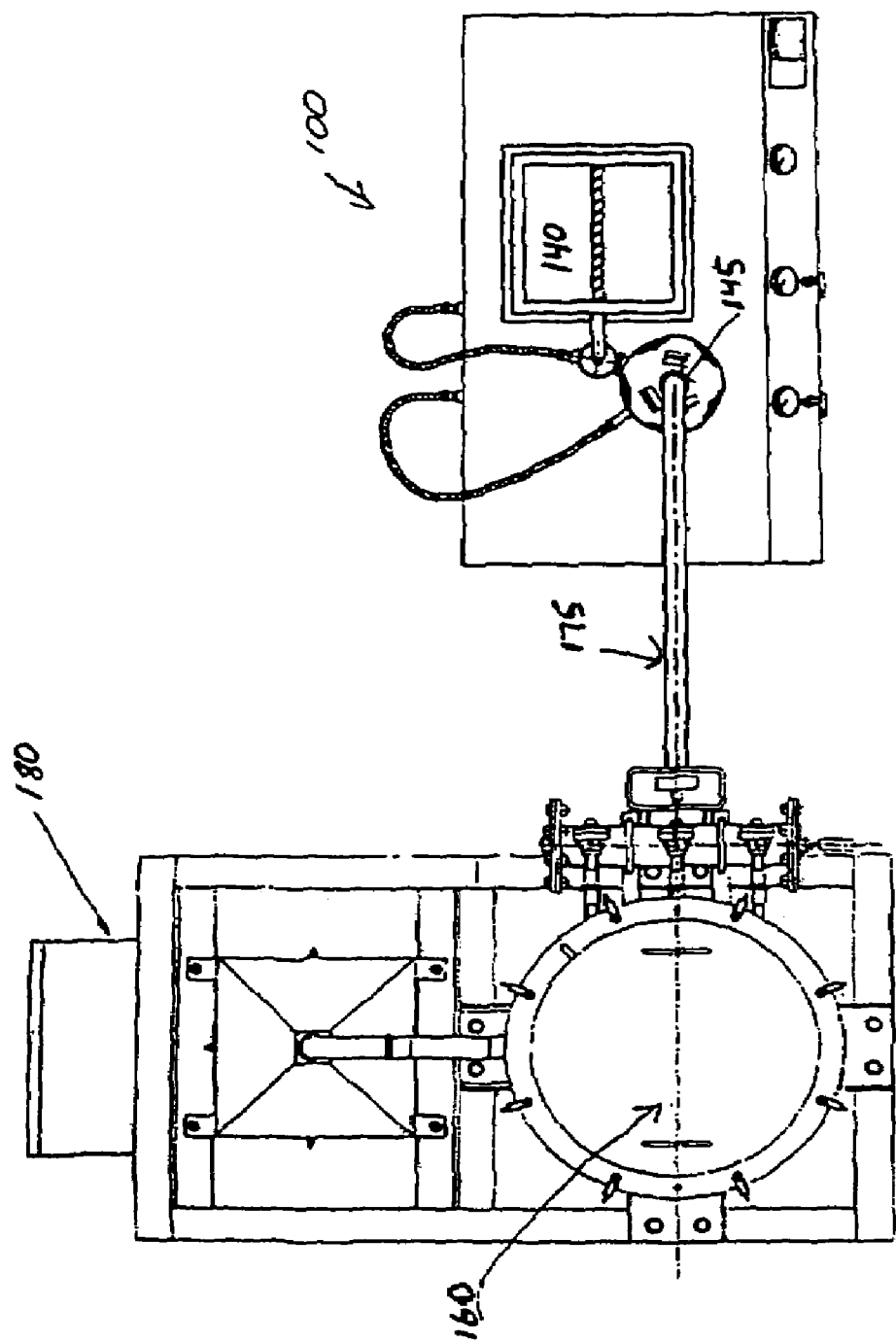

Referring now to FIGS. 1h and 1i, there are seen front and top views, respectively, of the jet-mill assembly 100, a dust collector 160, and a collection container 170. In one embodiment, the fibrillized carbon-binder particles that exit through the output connection 145 are guided by a discharge hose 175 from the jet-mill 130 into a dust collector 160. In the illustrated embodiment, the dust collector 160 is model CL-7-36-11 available from Ultra Industries, Inc., 1908 DeKoven Avenue, Racine, Wis. 53403; telephone number (262) 633-5070. Within the dust collector 160 the output of the jet-mill 130 is separated into (1) air, and (2) a dry fibrillized carbon-binder particle mixture 20. The carbon-binder mixture is collected in the container 170, while the air is filtered by one or more filters and then discharged. The filters, which may be internal or external to the dust collector 160, are periodically cleaned, and the dust is discarded. Operation of the dust collector is directed from a control panel 180. It has been identified that a dry compounded material, which is provided by dry fibrillization step 20, retains its homogeneous particle like properties for a limited period of time. In one embodiment, because of forces, for example, gravitational forces exerted on the dry particles 12, 14, and 16, the compounded material begins to settle such that spaces and voids that exist between the dry particles 12, 14, 16 after step 20 gradually become reduced in volume. In one embodiment, after a relatively short period of time, for example 10 minutes or so, the dry particles 12, 14, 16 compact together and begin to form clumps or chunks such that the homogeneous properties of the compounded material may be diminished and/or such that downstream processes that require free flowing compounded materials are made more difficult or impossible to achieve. Accordingly, in one embodiment, it is identified that a dry compounded material as provided by step 20 should be utilized before its homogeneous properties are no longer sufficiently present and/or that steps are taken to keep the compounded material sufficiently aerated to avoid clumping.

Figure 1J:
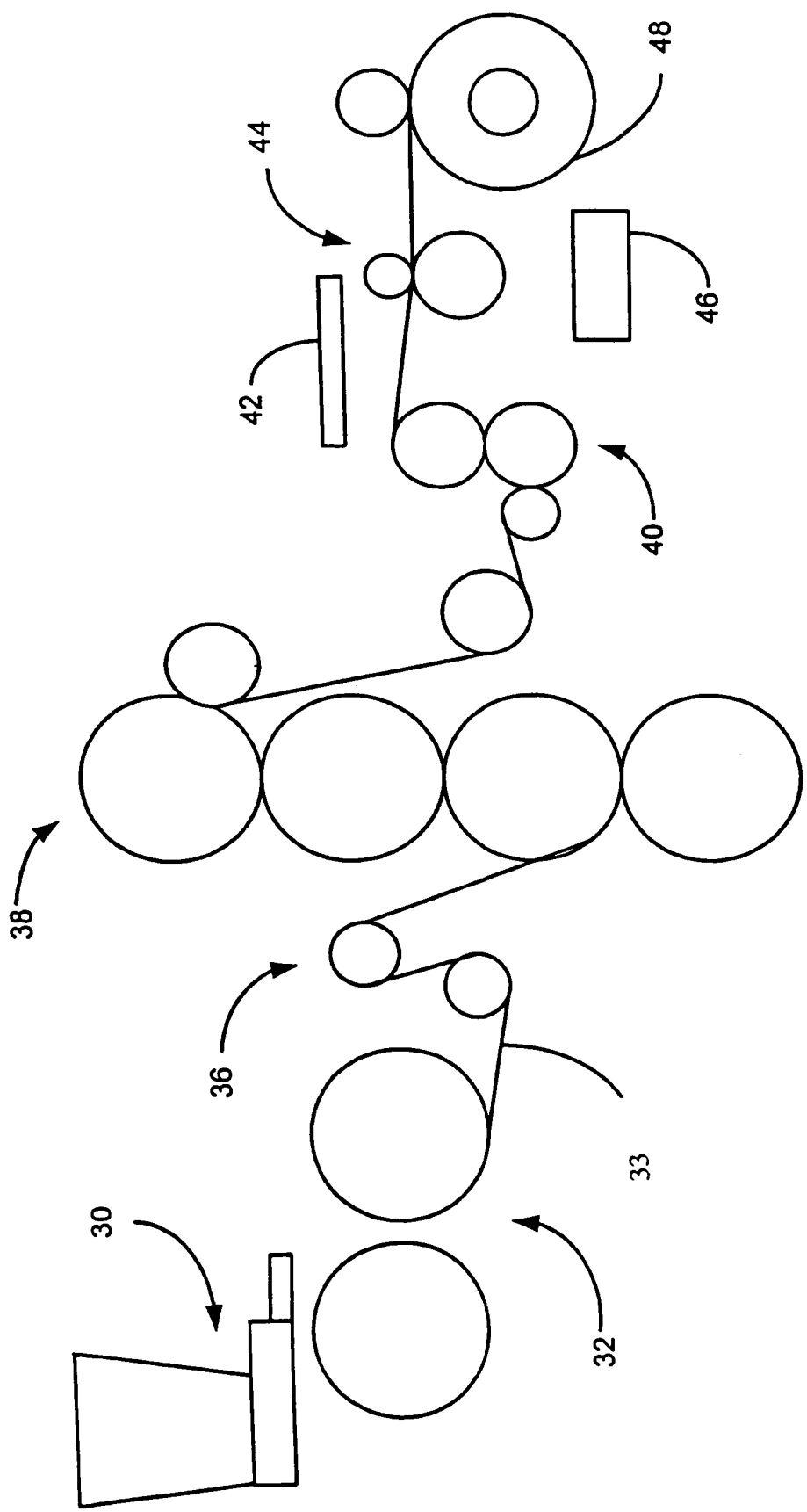

In one embodiment, shown in FIG. 1j the compounded material created by step 20 is fed from a feeder 30 into a high-pressure nip such as a roll mill, a calender, a belt-press, or a flat plate press 32. An emerging dry process based film 33 can be separated from the high pressure nip 32 using a doctor blade, or the edge of a thin strip of plastic or other separation material including metal or paper. Once the leading edge of the film 33 is removed from the high-pressure nip 32, the weight of the film 34 can be sufficient to separate the film from the 2-roll mill 32. The film 33 can be fed through a tension control system 36 into a calender 38. The calender 38 may further compact and densify the film 33 and further fibrillizes the binder. This reduces the thickness of the film 33 and increases the film's 33 tensile strength enough to make it self supporting. Multiple calendaring nips can be used to further reduce film thickness or increase tensile strength. Optionally, in low tensile strength bonding situations, the film 33 can be fed into sintering rolls 40 after the calender 38. The sintering rolls 40 can use heat to further bond together the conductive film 33 to form a homogeneous film. The film 33 emerging from the sintering rolls 40 is cooled by a blower 42 or chill rolls and the edges of the film 33 are trimmed by slitter 44 with scrap film to be deposited in collector 46. The finished film 33 may be wound onto a storage roll 48 or alternatively directed directly to a support backing and apparatus used to spray the electrode with a conductive material. Thus, a homogeneous dry process based conductive electrode film may be formed without using any lubricant, solvent, or liquid solution during its manufacture.

Referring back to FIG. 1a, after a support backing is placed adjacent to one side of the electrode film in step 33, a conductive material is applied onto the opposite side of the film in a step 4. In one embodiment, a conductive material is applied by a spraying device. In one embodiment, the conductive material is a metal. Step 4 is part of step 26 in FIG. 1b. The spraying device is configured to cover the side of the film opposite to the support backing such that the conductive material impregnates the film with vein like paths of the conductive material. In step 6 of FIG. 1a, the spray covered film is bonded to a current collector, with the sprayed side of the film being mated to the current collector. Bonding can be effectuated by applying pressure to the electrode film and collector, for example, as applied by a calender device. This step is part of step 28 in FIG. 1b. In one embodiment, in step 8, the support backing can be removed. In one embodiment, step 8 can be omitted and the support backing may be retained, for example, wherein the support backing is a separator used as part of a final energy storage device.

In one embodiment, the support backing may be configured as a physical support, which prevents the conductive spray from damaging the film 33. The support backing can also be configured to act as a heat sink to further prevent heat damage to the electrode film that could be caused by a molten spray. Examples of suitable support backings include porous rolls, backing plates, and/or similar type structures that a long sheet of the electrode film can be passed over at the point of application of the conductive spray. Because the electrode film can be made long, dry, and self supporting, it can readily be rolled and unrolled as needed for storage and use both before and after the spraying step 4. In one embodiment, because a dry process based electrode film need not be dried to remove solvents or the like, it can be sprayed immediately after it has been sufficiently compacted, for example, after exiting roll 44 of the apparatus of FIG. 1j, thus reducing process steps and time.

Various spray coating and/or impregnating methods can be used according to the present invention. Examples of suitable methods include flame spraying, arc spraying, plasma spraying, and high velocity oxygen fuel (HVOF) thermal spraying, which are well known by those skilled in the art. In one embodiment, molten aluminum or another highly conductive material can be used to coat one side of an electrode film as well as to penetrate inter-particle spaces in the film so as to create conductive pathways within the film. It is understood, that the depth of the conductive pathways beneath the surface may vary according to application, for example, between a depth of about 0 depth to about a full depth of the film. When a coated side of an electrode film is placed against a current collector, the conductive coating/current collector interface and conductive pathways in the film create low resistance electrical contacts between the electrode film and the current collector. The benefits derived from such lowered resistance have been described and would be understood by those skilled in the art.

Figure 2:
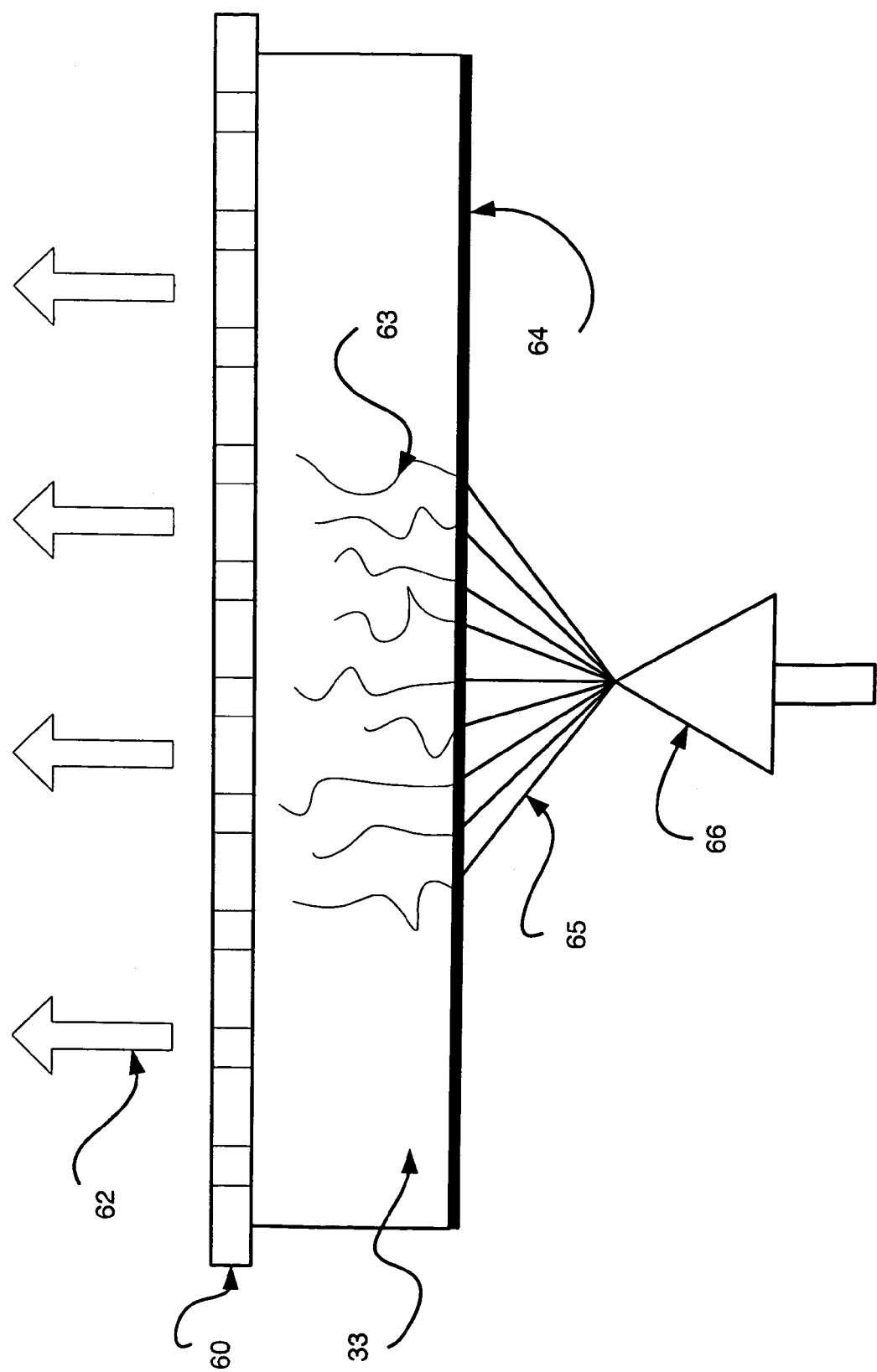
FIG. 2 is a cross-sectional view of a particle based conductive film impregnated with a sprayed conductor.

FIG. 2 is a cross-sectional view of a dry process particle based conductive electrode film coated and impregnated using a sprayed conductor. As shown in FIG. 2, a support backing 60 is placed adjacent to one side of a dry process based film 33, and molten conductor 65 is sprayed on the opposite side of the film 33 by a spray unit 66. The molten conductor 65 desirably forms a conductive coating 64 on one side of the film 33, some of which is forced into inter-particle spaces of the film 33 to form "veins" 63 of conductive material throughout the film 33. Various optimization techniques can be used to ensure that the conductive material penetrates and coats the film 33 evenly. For example, in a spraying process, the spray velocity of the spray unit 66, the pressure of the spray, the standoff distance of the spray 65 from the film 33, the vertical step distance, and the sweep rate of the spray unit 66 can be adjusted to optimize coating and penetration.

In one embodiment, a porous roll can be used as the support backing 60, and a partial vacuum 62 can be used in conjunction with the porous roll to hold the film 33 onto the support backing 60. At the same time, the porous roll can function as a heat sink to prevent heat damage to the film 33 from the molten conductor 65 spray. Alternatively, support backing 60 can be a non porous roll or comprise a backing plate or other suitable support structure. In one embodiment, the support backing comprise a separator used to separate electrode films of a final energy storage device product.

Figure 3:
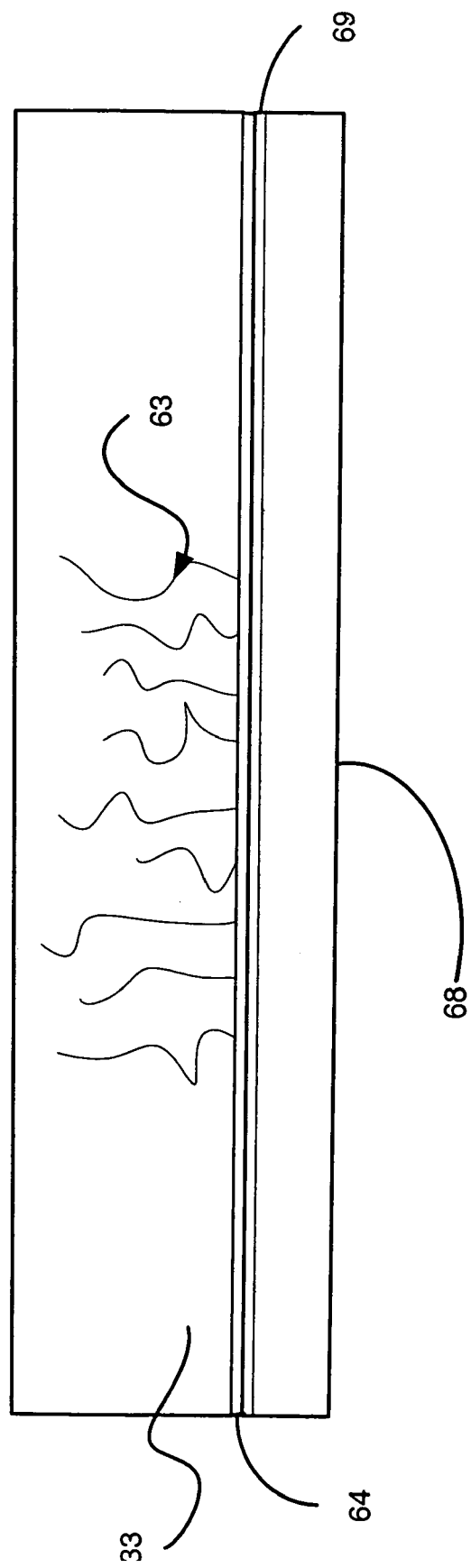
FIG. 3 is a cross-sectional view of an electrode.

In FIG. 3, bonding of a current collector and a dry process particle based conductive electrode film is shown. In one embodiment, a current collector 68 may be coupled to a sprayed dry process based conductive electrode film 33 by a predisposed intermediate layer of wet adhesive 69 such that the coating/adhesive provides additional bonding between a collector 68 and the electrode film 33. In one embodiment, the wet adhesive 69 may be deposited onto the coating 64. In one embodiment, the wet adhesive 69 may first be deposited on collector 68.

Figure 4:
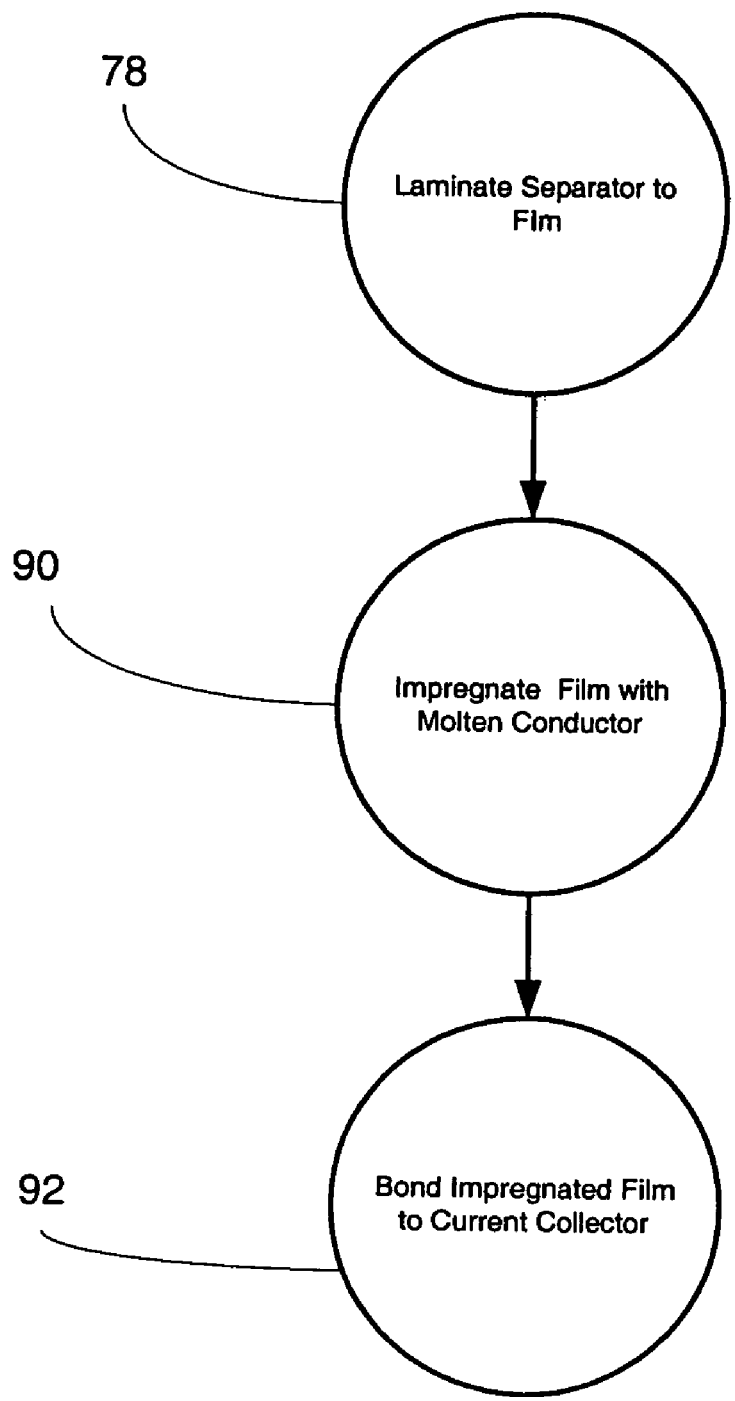
FIG. 4 illustrates process steps in making an electrode.

Referring now to FIG. 4, in a step 78, in one embodiment, a dry process particle based electrode film 33 may laminated to one side of an electrode separator. Those skilled in the art will identify that in this embodiment, the separator may act as a support structure. In one embodiment, in step 90, molten conductive material may be sprayed on the opposite side of a film 33. In step 92, the sprayed film(s) 33 and separator may be coupled to a current collector (not shown) via the sprayed conductor.

Figure 5:
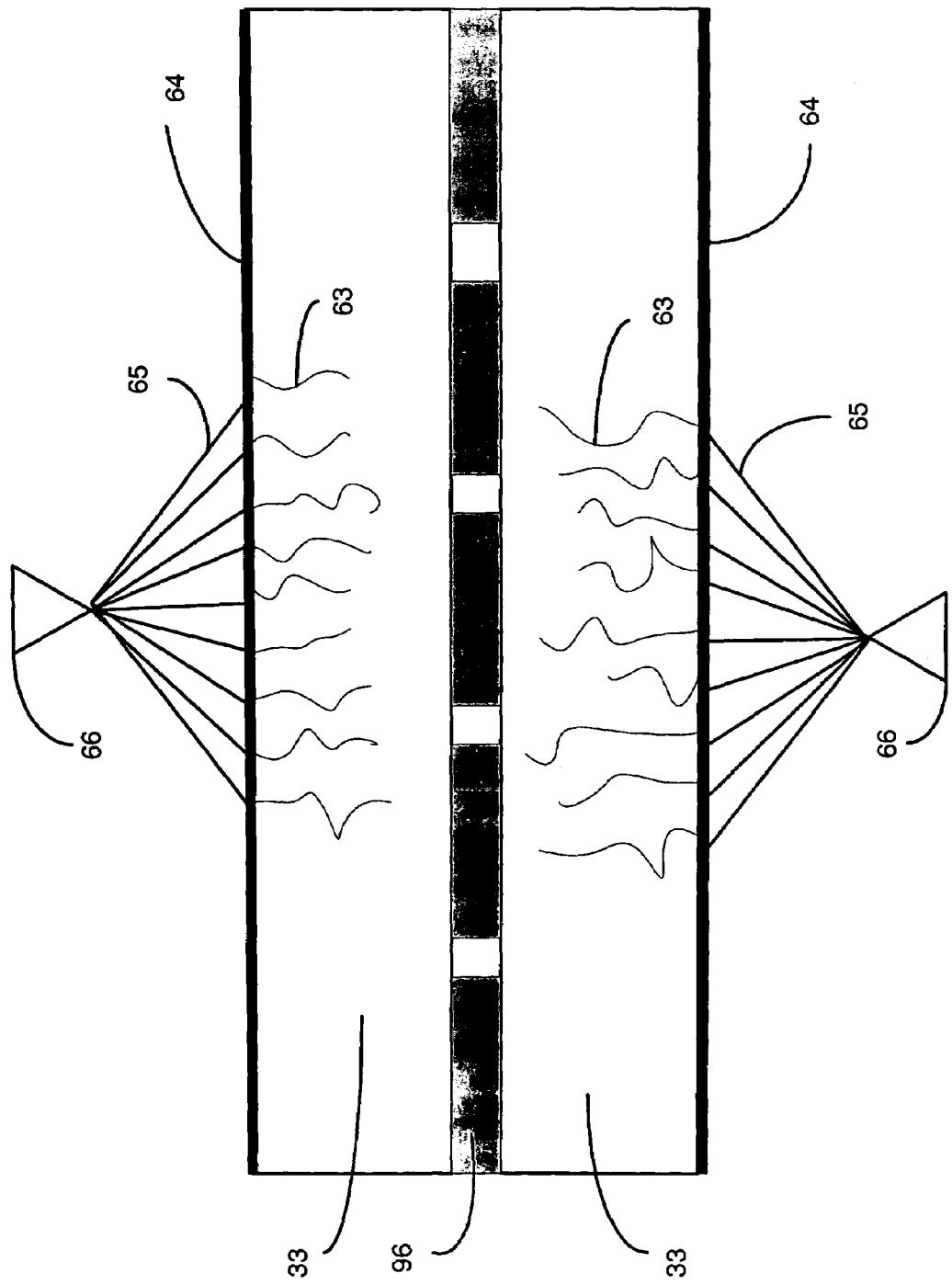
FIG. 5 is a cross-sectional view of sprayed electrode films bonded to a separator.

As is shown in FIG. 5, in one embodiment, two electrode films 33 are laminated to respective sides of an electrode separator 96. Dual spray units 66 can be used to form a coating 64 of conductive material on the sides of the films 33 opposite the separator 96, by spraying molten conductor 65 from the spray units 66 onto the films 33. The spray units 66 can be configured to force conductive material into the inter-particle spaces of the film 33 to form conductive veins 63.

Figure 6:
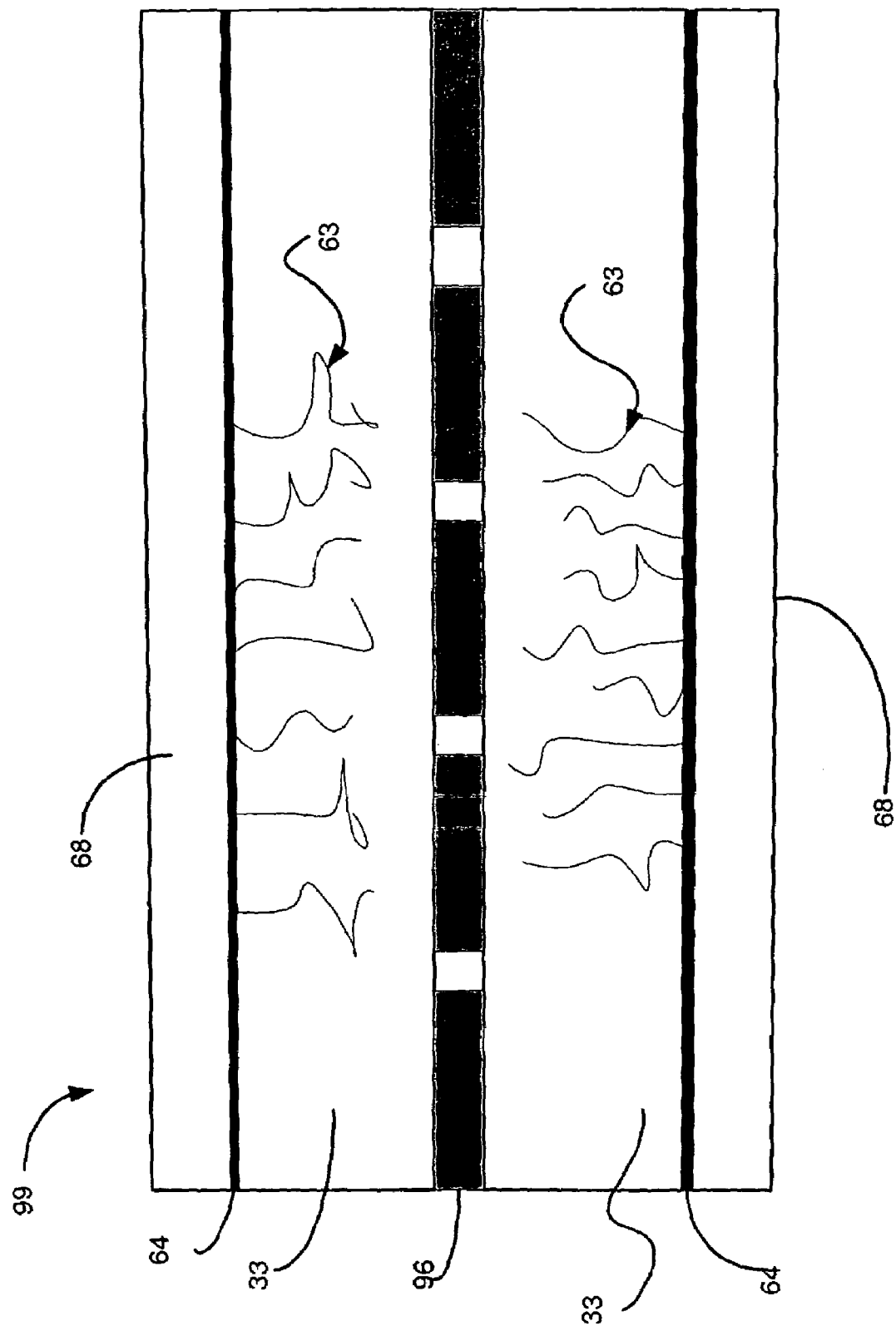
FIG. 6 is a cross-sectional view of sprayed electrode films bonded to a separator and collector.

As is shown in FIG. 6, two current collectors and two electrode films are bonded to form a double-layer capacitor electrode. In one embodiment, a double-layer capacitor electrode 99 comprises two current collectors 68 bonded to respective sprayed films 33, and an electrode separator 96 disposed there between. In one embodiment, the films 33 may be formed by a dry fibrillization process as disclosed herein. In one embodiment, an intermediate layer of wet adhesive 69 may be provided on each sprayed collector 68 to provide an additional bond between the collector(s) 68 and respective sprayed films 33. However, it has been is identified that because coating 64 itself provides sufficient low resistance adhesive functionality, an additional wet adhesive 69 layer need not be utilized. By eliminating use of wet adhesive 69, it is further identified that thermal and chemical stability of a capacitor 99 may be improved because degradation of solvents and impurities within the adhesive does not occur. Also, without use a layer of a wet adhesive 69, the inherent process and yield inefficiencies associated with application of the adhesive are eliminated.

Thus, according to aspects and advantage discussed herein, it has been identified that sufficiently low resistance adhesive contact between a sprayed dry process based electrode film 33 and a respective collector 68 may be made without use of an intermediate layer of adhesive 69. Such low resistance adhesive contact is effectuated by the conductive coating 64 and conductive veins 63 created during the coating/impregnation step 26 of FIG. 1b.

Figure 7:
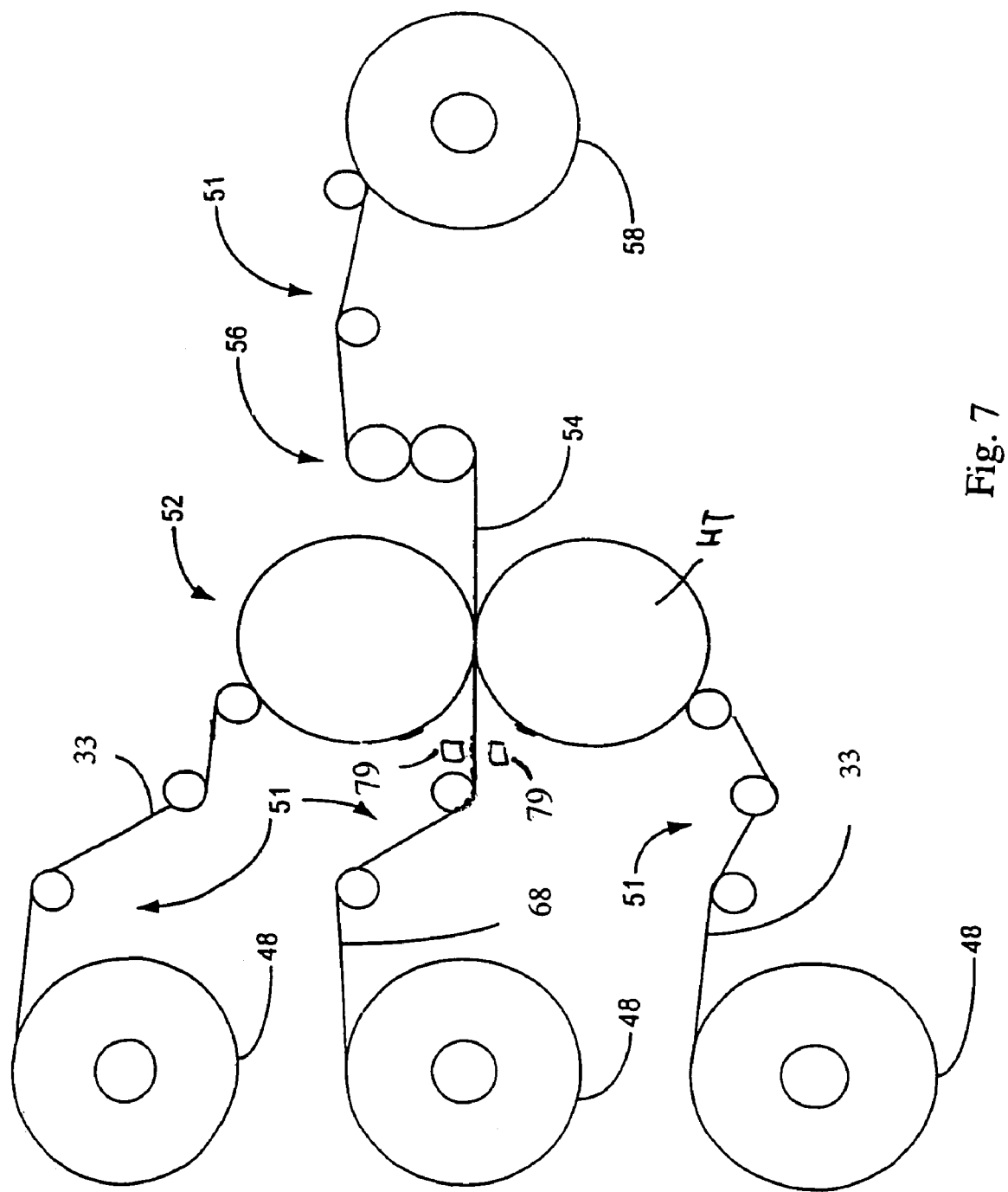
FIG. 7 is a representation of an apparatus used to bond collectors and sprayed electrode films.

Referring to FIG. 7, and preceding Figures as needed, there is seen an apparatus used to adhesively bond sprayed and impregnated electrode films directly to a current collector. In bonding step, two electrode films 33 are adhesively bonded to a current collector 68. In one embodiment, the current collector comprises an etched or roughened aluminum sheet, foil, mesh, screen, porous substrate, or the like. In one embodiment, the current collector comprises a metal, for example, copper, aluminum, silver, gold, and the like. In one embodiment, current collector comprises a thickness of about 30 microns. Those skilled in the art will recognize that if the electrochemical potential allows, other metals could also be used as a collector.

In one embodiment, a current collector 68 and two sprayed electrode films 33 are fed from storage rolls 48 into a heated roll-mill 52 such that the current collector 68 is positioned between two self-supporting dry films 33. In one embodiment, the electrode films 33 fed from storage rolls 48 may comprise an attached separator. In one embodiment, the current collector 68 may be pre-heated by a heater 79. The temperature of the heated roll-mill 52 may be used to heat and soften/melt the sprayed metal impregnated within the two electrode films 33 such that sufficiently good adhesion of the films to the collector 68 is effectuated. In one embodiment, a roll-mill 52 temperature of at the nip of the roll is between 100° C. and 300° C. In one embodiment, the nip pressure is selected between 50 pounds per linear inch (PLI) and 1000 PLI. Each metal impregnated electrode film 33 becomes calendared and bonded to a side of the current collector 68. After exiting the hot roll nip 52, it is identified that the resulting calendared impregnated electrode film and collector product can be provided as a electrode 54 for use in an energy storage device, for example, as a double-layer capacitor electrode. In one embodiment, the dry electrode 54 can be S-wrapped over chill rolls 56 to set the electrode film onto the collector. The resulting dry electrode 54 can then be collected onto another storage roll 58. Tension control systems 51 can also be employed by the system shown in FIG. 7.

It is identified that because a sprayed adhesive conductive coating 64 may be provided on an electrode film 33, no alignment of the film 33 to a precoated layer of wet adhesive on the collector 68 need occur. In this regard, other than a centered alignment of the film(s) 33 to within the boundaries of the collector 68, no further precise alignment of the electrode film 33 need be made, unless so desired. In other words, because no alignment of the electrode film 33 to an adhesive layer on the collector 68 need be made, alignment of the film 33 in relation to the collector 68 can be more-or-less self-aligning, or in further words, the film 33 comprises self aligning adhesive functionality. Those skilled in the art will identify, such self-aligning functionality would result in a large savings of time and money as compared to the alignment intensive and critical processes of the prior art.

Figure 8A:
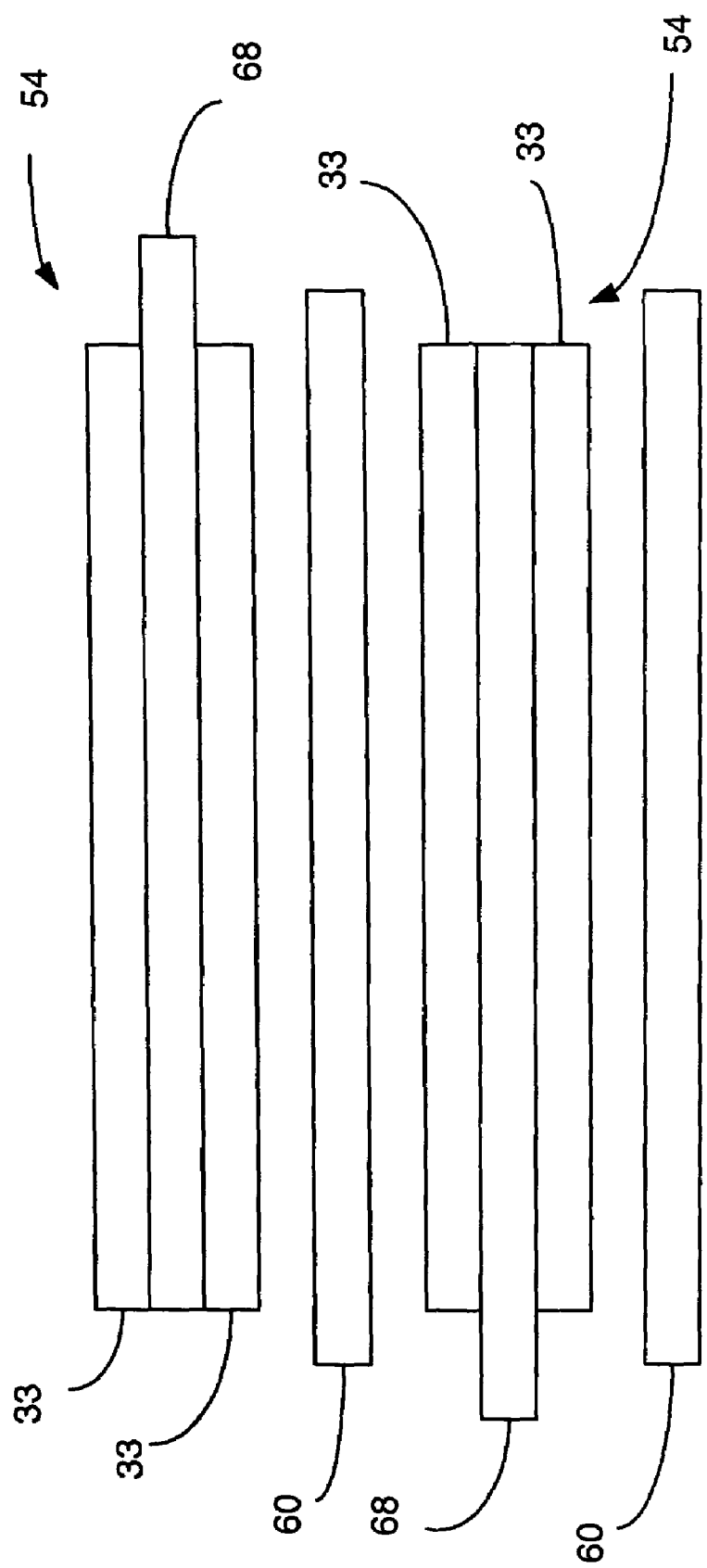
FIG. 8a is side-view representation of layers of an electrode.
Figure 8B:
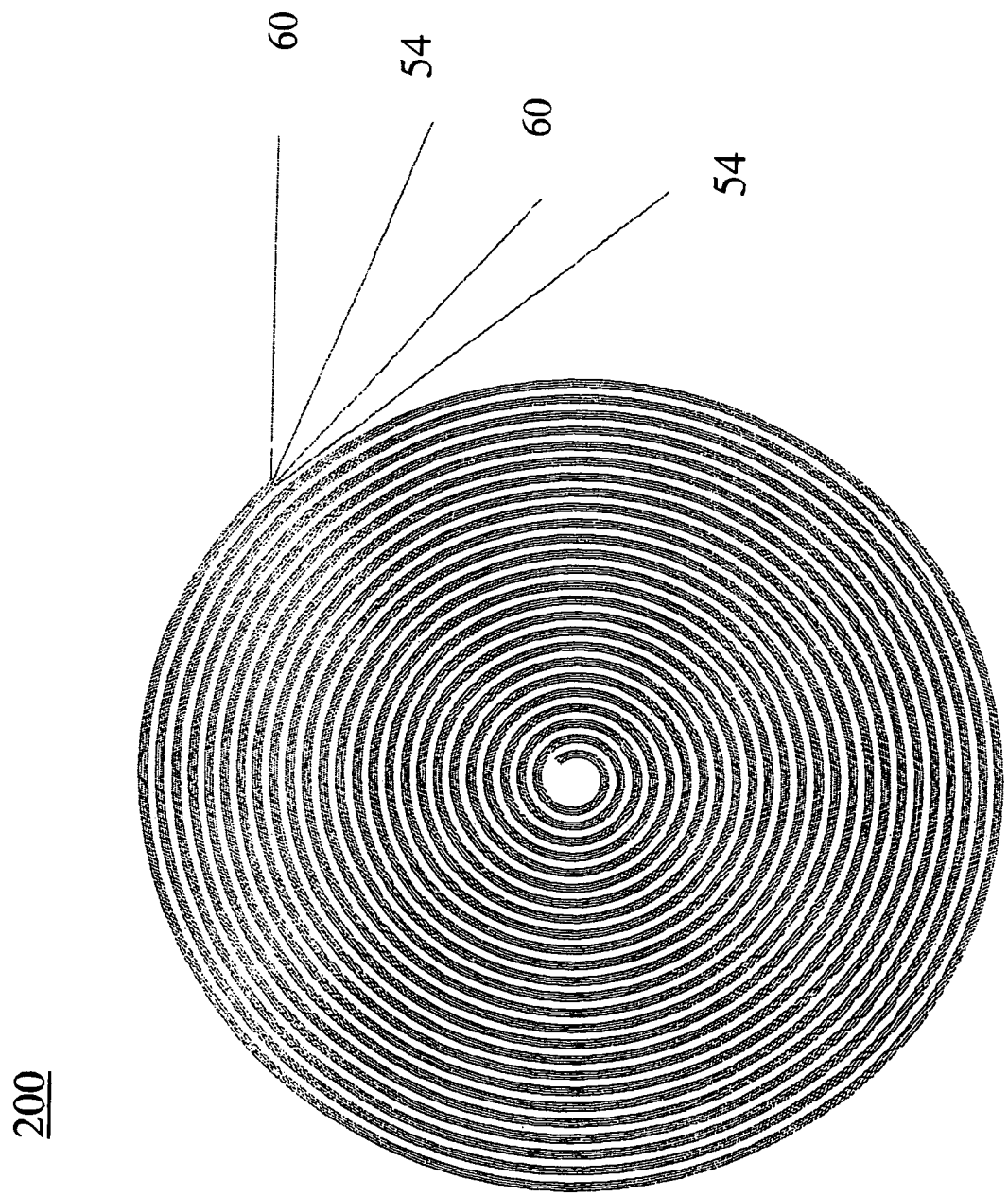
FIG. 8b is a top-view of a jellyroll electrode.

Referring now to FIGS. 8a and 8b, and preceding Figures as needed, there are seen exploded structures of an energy storage device. In FIG. 8a, there are shown cross-sections of four electrode films 33, which are bonded to a respective current collector 68 according to one or more embodiments described previously herein. First surfaces of each of the dry films 33 are coupled via sprayed coatings (not shown) to respective current collectors 68 in a configuration that is shown as a top dry electrode 54 and a bottom dry electrode 54. According to one or more of the embodiments discussed previously herein, the top and bottom dry electrodes 54 are formed from a blend of dry particles without use of any additives. In one embodiment, the top and bottom dry electrodes 54 are separated by a separator 60. In one embodiment, separator 60 comprises a porous paper sheet of about 30 microns in thickness. As described previously, separator 60 may previously have provided a function of a support backing during spraying of conductive material on the electrode films. Extending ends of respective current collectors 68 are used to provide a point at which electrical contact can be effectuated. In one embodiment, the two dry electrodes 54 and separators 70 are subsequently rolled together in an offset manner that allows an exposed end of a respective collector 68 of the top electrode 54 to extend in one direction and an exposed end of a collector 50 of the bottom electrode 54 to extend in a second direction. The resulting geometry is known to those skilled in the art as a jellyroll and is illustrated in a top view by FIG. 8b.

Referring now to FIG. 8b, and preceding Figures as needed, first and second dry electrodes 54, and separators 60, are rolled about a central axis to form a rolled energy storage device 200. In one embodiment, two electrode films 33 (FIG. 7) comprise a width and a length. In one embodiment, one square meter of a 150 micron thick electrode film 33 weighs about 0.1 kilogram. In one embodiment, the dry films 33 comprise a thickness of about 80 to 260 microns. In one embodiment, a width of the electrode films comprises between about 10 to 300 mm. In one embodiment, a length is about 0.1 to 5000 meters and the width is between 30 and 150 mm. Other particular dimensions may be may be determined by a required final energy storage device storage parameter. In one embodiment, wherein the electrodes are utilized in a double-layer capacitor product, the storage parameter may be between values of 1 and 5000 Farads. With appropriate changes and adjustments, other electrode film 33 dimensions and other capacitance are within the scope of the invention. Those skilled in the art will understand that offset exposed current collectors 68 (shown in FIG. 8a) extend from the roll, such that one collector extends from one end of the roll in one direction and another collector extends from an end of the roll in another direction. In one embodiment, the collectors 68 may be used to make electric contact with internal opposing ends of a sealed housing, which can include corresponding external terminals at each opposing end for completing an electrical contact.

Figure 9:
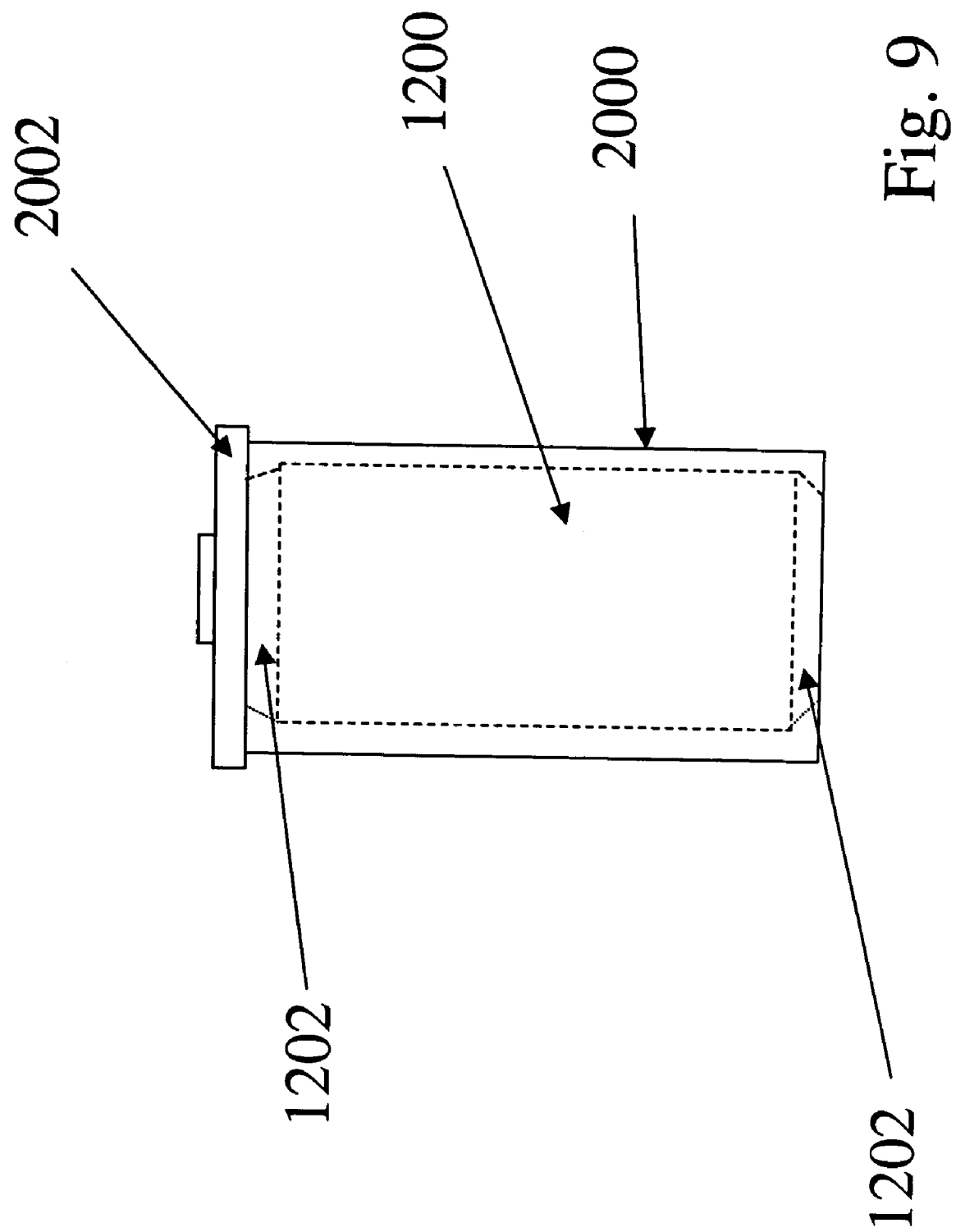
FIG. 9 is a cross-sectional view of a capacitor cell in a housing.

Referring now to FIG. 9, and preceding Figures as needed, during manufacture, a rolled electrode 1200 made according to one or more of the embodiments disclosed herein is inserted into an open end of a housing 2000. An insulator (not shown) is placed along a top periphery of the housing 2000 at the open end, and a cover 2002 is placed on the insulator. During manufacture, the housing 2000, insulator, and cover 2002 may be mechanically curled together to form a tight fit around the periphery of the now sealed end of the housing, which after the curling process is electrically insulated from the cover by the insulator. When disposed in the housing 2000, respective exposed collector extensions 1202 of electrode 1200 make internal contact with the bottom end of the housing 2000 and the cover 2002. In one embodiment, external surfaces of the housing 2000 or cover 2002 may include or be coupled to standardized connections/connectors/terminals to facilitate electrical connection to the rolled electrode 1200 within the housing 2000. Contact between respective collector extensions 1202 and the internal surfaces of the housing 2000 and the cover 2002 may be enhanced by welding, soldering, brazing, conductive adhesive, or the like. In one embodiment, a welding process may be applied to the housing and cover by an externally applied laser welding process. In one embodiment, the housing 2000, cover 2002, and collector extensions 1202 comprise substantially the same metal, for example, aluminum. An electrolyte can be added through a filling/sealing port (not shown) to the sealed housing 1200. In one embodiment, the electrolyte is 1.5 M tetrametylammonium or tetrafluroborate in acetonitrile solvent. After impregnation and sealing, a finished product is thus made ready for commercial sale and subsequent use.

Although the particular systems and methods herein shown and described in detail are fully capable of attaining the above described object of this invention, it is understood that the description and drawings presented herein represent some, but not all, embodiments of the invention and are therefore representative of the subject matter which is broadly contemplated by the present invention. For example, although double-layer capacitor electrodes are discussed herein in the context of energy storage devices, those skilled in the art will identify that aspects and advantages described herein may apply to electrodes used in other energy storage devices, for example, batteries, fuel cells, and the like.

Thus, it is further understood that the scope of the present invention fully encompasses other embodiments that may become obvious to those skilled in the art and that the scope of the present invention should be limited only by the appended claims and their legal equivalents.

What is claimed is:

1. An energy storage device comprising:
   a self-supporting electrode film, the film comprising a blend of only fibrillized carbon and binder particles;
   a collector; and
   a sprayed conductor,
   wherein the spayed conducter is deposited onto the self-supporting electrode film,
   wherein the sprayed conductor is disposed between the collector and the film, and
   wherein the sprayed conductor penetrates between the particles.

2. The energy storage device of claim 1, wherein the collector comprises aluminum.

3. The energy storage device of claim 1, wherein the conductor is coupled to the collector.

4. The energy storage device of claim 1, wherein the conductor comprises a metal.

5. The energy storage device of claim 1, wherein the blend is a dry fibrillized blend of carbon and binder particles.

6. The energy storage device of claim 1, wherein the device comprises a capacitor.

7. The energy storage device electrode of claim 6, wherein the capacitor comprises a double-layer capacitor.

8. The energy storage device of claim 1, wherein the device comprises a battery.

9. The energy storage device of claim 1, wherein the device comprises a fuel cell.

10. The energy storage device of claim 1, wherein the collector is a bare collector.

11. An energy storage product comprising:
    a self supporting electrode film; and
    a conductive sprayed metal,
    wherein the conductive sprayed metal is coupled to one side of the electrode film as a spray,
    wherein the conductive sprayed metal is disposed within the electrode film between the particles, and
    wherein the electrode film is formed of only fibrillized carbon and binder particles.

12. The product of claim 11, wherein the electrode film is formed of dry fibrillized carbon and binder particles.

13. The product of claim 11, further comprising a collector,
    wherein the conductive sprayed metal is disposed between the collector and the film.

14. The product of claim 13, wherein the electrode film is as a roll.

15. The product of claim 13, wherein the electrode film is self-aligning to the collector.

16. The product of claim 11, further comprising a separator, wherein the separator is coupled to a second side of the electrode film.

* * * * *